(12) United States Patent
Quaderer et al.

(10) Patent No.: US 10,703,036 B2
(45) Date of Patent: Jul. 7, 2020

(54) MEMBERS FOR SEALING, BAFFLING, OR REINFORCING

(71) Applicant: Zephyros, Inc., Romeo, MI (US)

(72) Inventors: Dean Quaderer, Livonia, MI (US); Erin White, Wales Township, MI (US); Keith Novak, Attica, MI (US); Blake Synnestvedt, Bloomfield Hills, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 15/569,533

(22) PCT Filed: Apr. 28, 2016

(86) PCT No.: PCT/US2016/029800
§ 371 (c)(1),
(2) Date: Oct. 26, 2017

(87) PCT Pub. No.: WO2016/176459
PCT Pub. Date: Nov. 3, 2016

(65) Prior Publication Data
US 2018/0085986 A1    Mar. 29, 2018

Related U.S. Application Data

(60) Provisional application No. 62/154,778, filed on Apr. 30, 2015, provisional application No. 62/270,663, filed on Dec. 22, 2015.

(51) Int. Cl.
*B29C 48/03* (2019.01)
*B29C 44/18* (2006.01)
(Continued)

(52) U.S. Cl.
CPC .......... *B29C 48/131* (2019.02); *B29C 48/254* (2019.02); *B62D 25/00* (2013.01);
(Continued)

(58) Field of Classification Search
CPC . B29C 47/0035; B29C 47/0808; B29C 44/32; B29C 44/188; B62D 29/04;
(Continued)

(56) References Cited

U.S. PATENT DOCUMENTS 4,751,249 A    6/1988  Wycech
4,901,500 A    2/1990  Wycech
(Continued)

FOREIGN PATENT DOCUMENTS

CN    1315990 A    10/2001
CN    1812909 A    8/2006
(Continued)

OTHER PUBLICATIONS

PCT International Search Report & Written Opinion dated Jul. 25, 2016; PCT/US2016/029800.
(Continued)

*Primary Examiner* — David Sample
*Assistant Examiner* — Donald M Flores, Jr.
(74) *Attorney, Agent, or Firm* — Bryan S. Lemanski; The Dobrusin Law Firm, P.C.

(57) ABSTRACT

An article comprising: a carrier (12), activatable material (14) disposed on the carrier, one or more carrier extensions (16) extending from the carrier; wherein the article is adapted to provide sealing, baffling, or reinforcement within a structure's cavity.

18 Claims, 17 Drawing Sheets

(51) Int. Cl.
    *B29C 44/32* (2006.01)
    *B29C 48/25* (2019.01)
    *B62D 25/00* (2006.01)
    *B62D 29/04* (2006.01)
    *F16J 15/02* (2006.01)
    *B62D 29/00* (2006.01)
    *B29L 31/30* (2006.01)

(52) U.S. Cl.
    CPC ........... *B62D 29/002* (2013.01); *B62D 29/04* (2013.01); *B29C 44/188* (2013.01); *B29C 44/32* (2013.01); *B29L 2031/3055* (2013.01); *F16J 15/02* (2013.01)

(58) Field of Classification Search
    CPC ........ B62D 25/00; B62D 29/002; F16J 15/02; B29L 2031/3055; Y10T 428/24479; Y10T 428/24008; Y10T 428/24; Y10T 428/24355; Y10T 428/24752; Y10T 428/24802
    See application file for complete search history.

(56) References Cited

U.S. PATENT DOCUMENTS

| | | | |
|---|---|---|---|
| 5,266,133 | A | 11/1993 | Hanley et al. |
| 5,708,042 | A | 1/1998 | Hasegawa |
| 5,755,486 | A | 5/1998 | Wycech |
| 5,766,719 | A | 6/1998 | Rimkus |
| 6,150,428 | A | 11/2000 | Hanley, IV et al. |
| 6,270,600 | B1 | 8/2001 | Wycech |
| 6,287,666 | B1 | 9/2001 | Wycech |
| 6,455,146 | B1 | 9/2002 | Fitzgerald |
| 7,249,415 | B2 | 7/2007 | Larsen et al. |
| 7,428,774 | B2 * | 9/2008 | Thomas ............... B62D 29/002 264/259 |
| 7,597,382 | B2 * | 10/2009 | Vilcek .................... B29C 44/18 296/187.02 |
| 7,784,186 | B2 | 8/2010 | White |
| 2003/0045620 | A1 | 3/2003 | Carlson et al. |
| 2003/0183317 | A1 | 10/2003 | Czaplicki |
| 2004/0204551 | A1 | 10/2004 | Czaplicki et al. |
| 2004/0262853 | A1 | 12/2004 | Larsen |
| 2007/0045866 | A1 | 3/2007 | Gray |
| 2007/0138683 | A1 * | 6/2007 | Kanie .................... B29C 44/18 264/51 |
| 2008/0029200 | A1 | 2/2008 | Sheasley |
| 2008/0111394 | A1 * | 5/2008 | Lewis ................. B62D 29/002 296/187.02 |
| 2009/0223739 | A1 * | 9/2009 | Duffin .................... B60R 13/08 181/196 |
| 2009/0233055 | A1 * | 9/2009 | White ................. B62D 29/002 428/192 |
| 2009/0246506 | A1 | 10/2009 | Zaluzec et al. |
| 2010/0197882 | A1 | 8/2010 | Imai |
| 2011/0241383 | A1 * | 10/2011 | Shin ..................... B62D 29/002 296/193.06 |
| 2011/0262735 | A1 * | 10/2011 | Hoefflin .................. B29C 44/18 428/316.6 |
| 2014/0138388 | A1 * | 5/2014 | Synnestvedt .......... B65D 90/52 220/563 |

FOREIGN PATENT DOCUMENTS

| | | |
|---|---|---|
| CN | 101557914 A | 10/2009 |
| CN | 101835677 A | 9/2010 |
| CN | 101977807 A | 2/2011 |
| CN | 102164809 A | 8/2011 |
| DE | 202007018160 U1 | 5/2008 |
| EP | 0625559 A1 | 11/1994 |
| EP | 0893332 B1 | 3/2002 |
| EP | 1458594 B1 | 8/2006 |
| WO | 95/25005 | 9/1995 |
| WO | 98/36944 | 8/1998 |
| WO | 00/46017 | 8/2000 |
| WO | 00/55444 A1 | 9/2000 |
| WO | 01/83206 A1 | 11/2001 |
| WO | 2005/002950 A2 | 1/2005 |
| WO | 2005/077634 A2 | 8/2005 |

OTHER PUBLICATIONS

Surface Tension Measurement of a Sample Reinforcer, dated May 2008.
Polymer Handbook, Fourth Edition, vol. 2, J. Bradrup, 1999.
Kruss Drop Shape Analysis, vol. 1.91, 2004-2009.
Handling and Storage Instructions for Injection Molders, Sika Technology AG, Version 1, Sep. 8, 2016.
Notice of Opposition dated May 6, 2015, Application No. EP11710363.0.
Handbook of Polymeric Foams and Foam Technology, Daniel Klempner, Nov. 14, 1991.
Collins English Dictionary, Harper Collins Publishers 1979, 1986, 1991, 1994, 1998.
Dictionary of Materials and Testing, Joan L. Tomsic, 2000.
European Patent 1790554B1, Opposition Thereto by Henkel AG & Co and Sika Tech. AG, Appendix I.
Kruss, Technical Note, Custom Made Models: from contact angle to surface free energy, Dec. 2008.
Standard Test Method for Measurement of the Surface Tension of Solid Coatings, Substrates and Pigments using Contact Angle Measurements, 2018.
ARDL, Test Report, PN 143946, Chemical Analytical Services, Sep. 20, 2018.
ARDL, Test Report, PN 142881, Chemical Analytical Services, Aug. 6, 2018.
Chinese Search Report dated Aug. 20, 2019, Application No. 2016800258330.
Chinese First Office Action dated Aug. 30, 2019, Application No. 2016800258330.

* cited by examiner

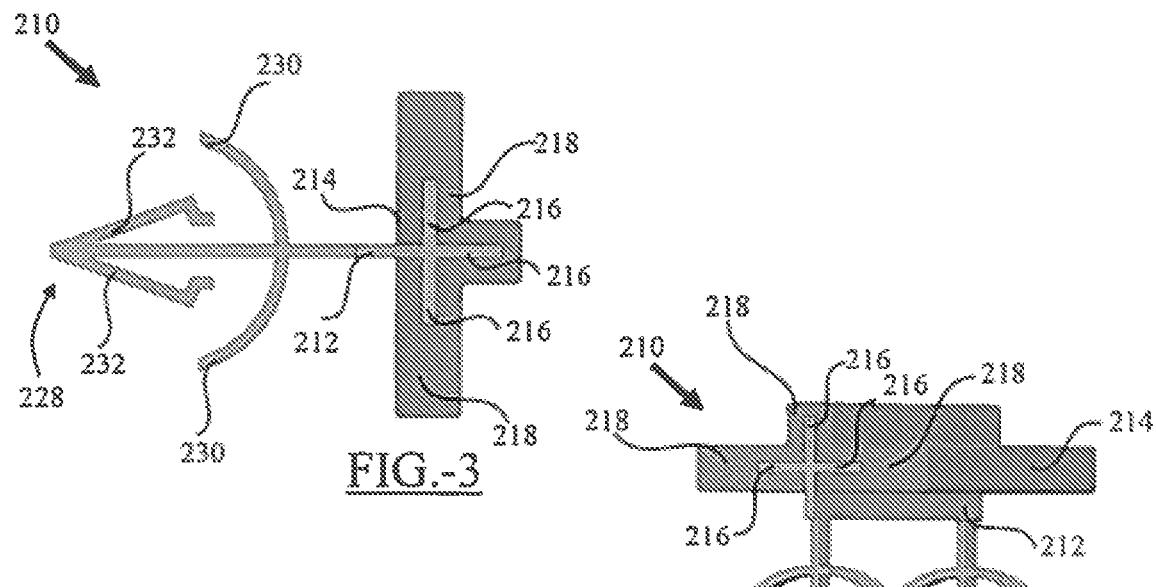
FIG.-3
FIG.-4
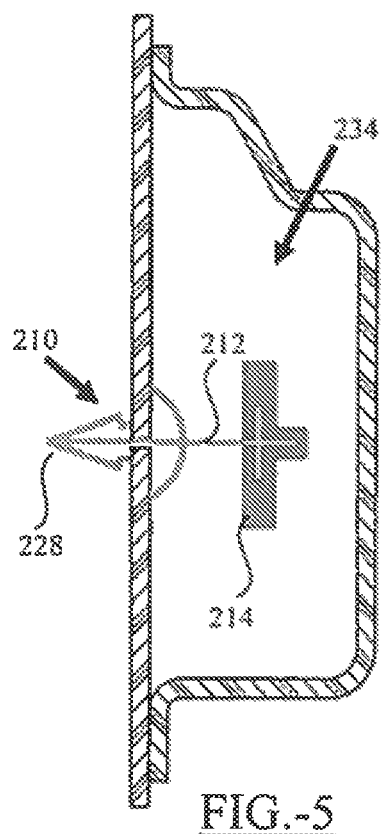
FIG.-5

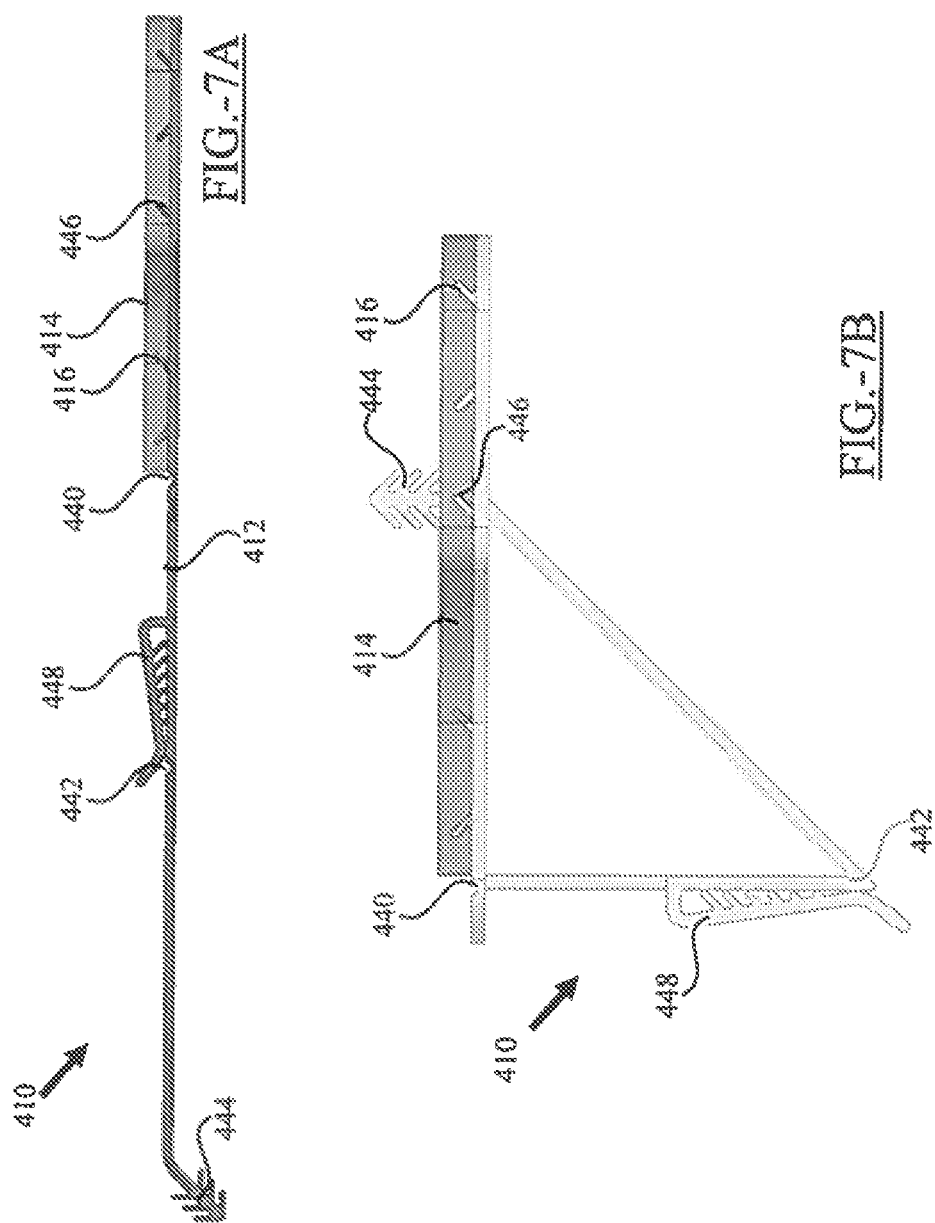

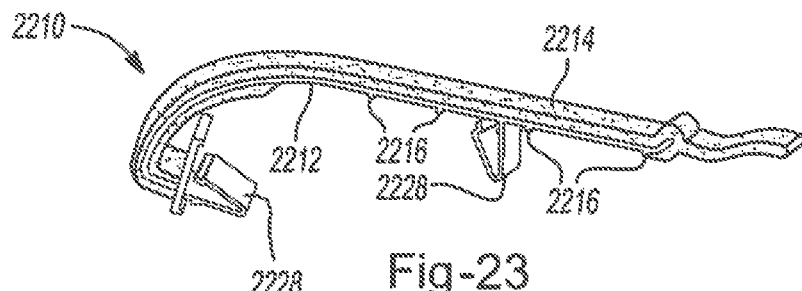
Fig-23
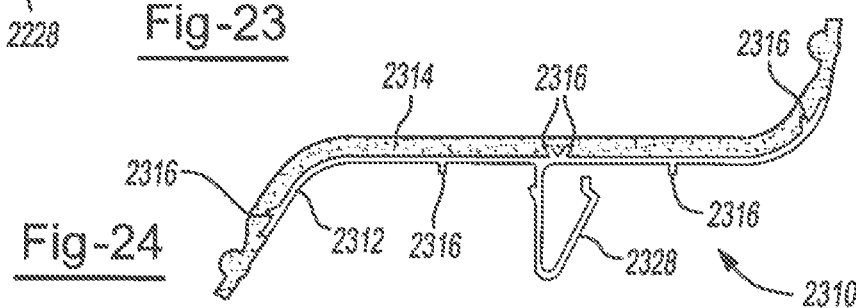
Fig-24
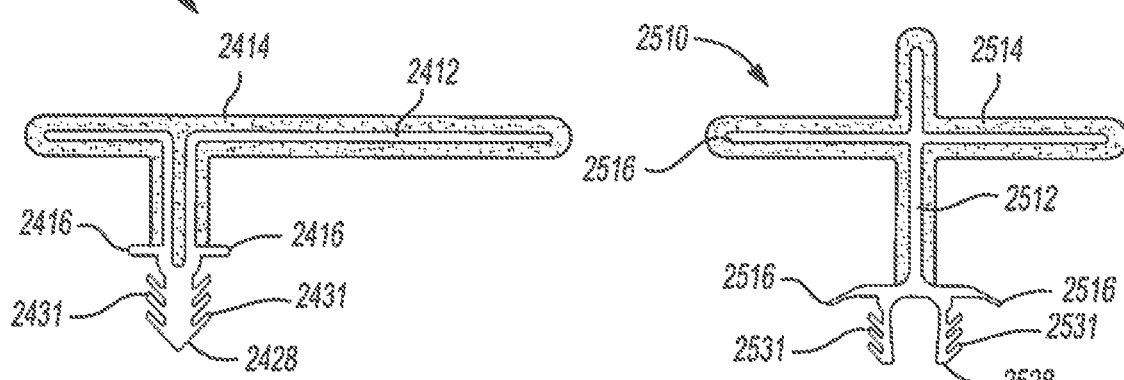
Fig-25
Fig-26
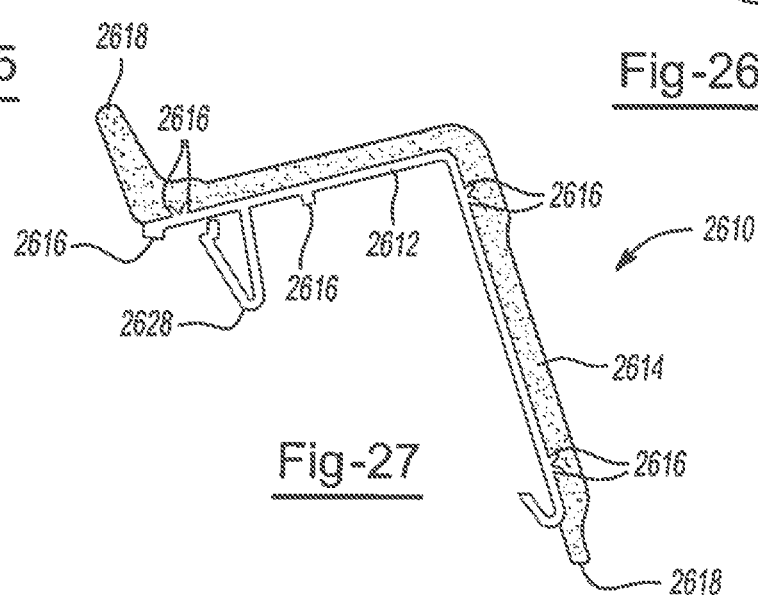
Fig-27

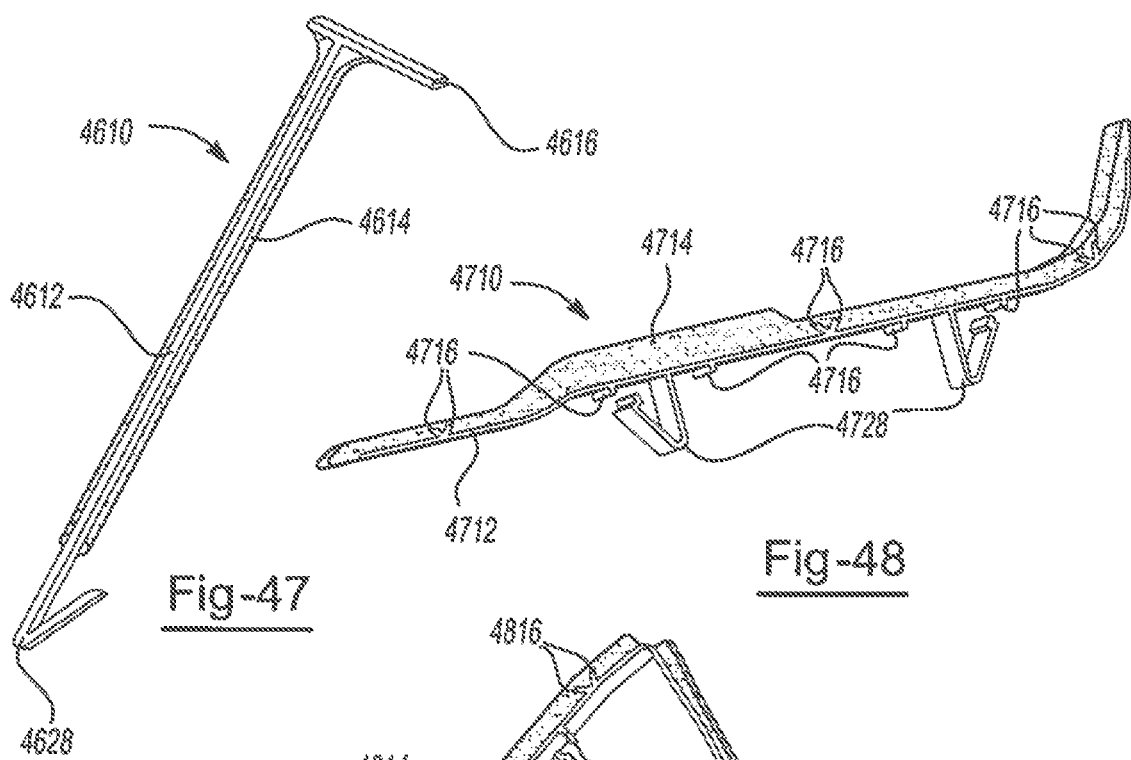
Fig-47
Fig-48
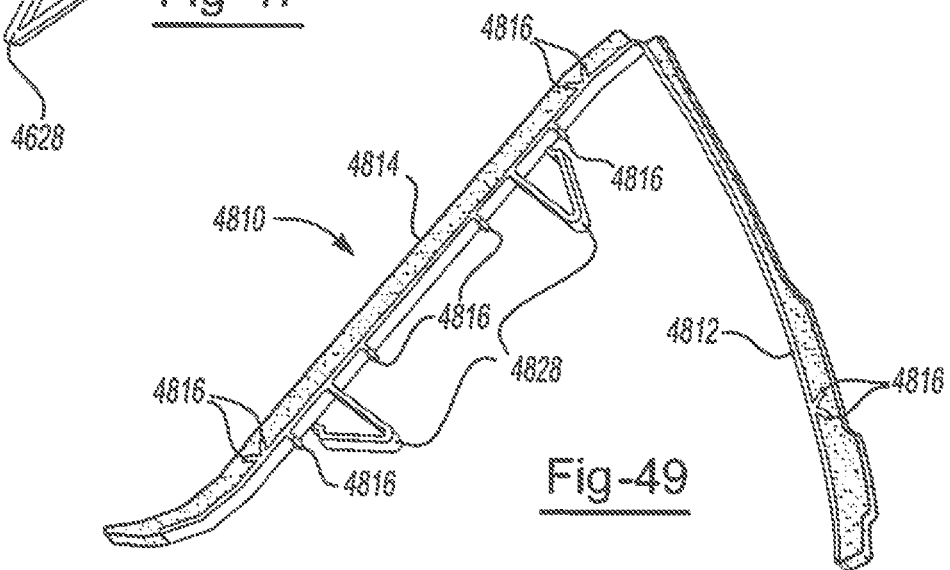
Fig-49
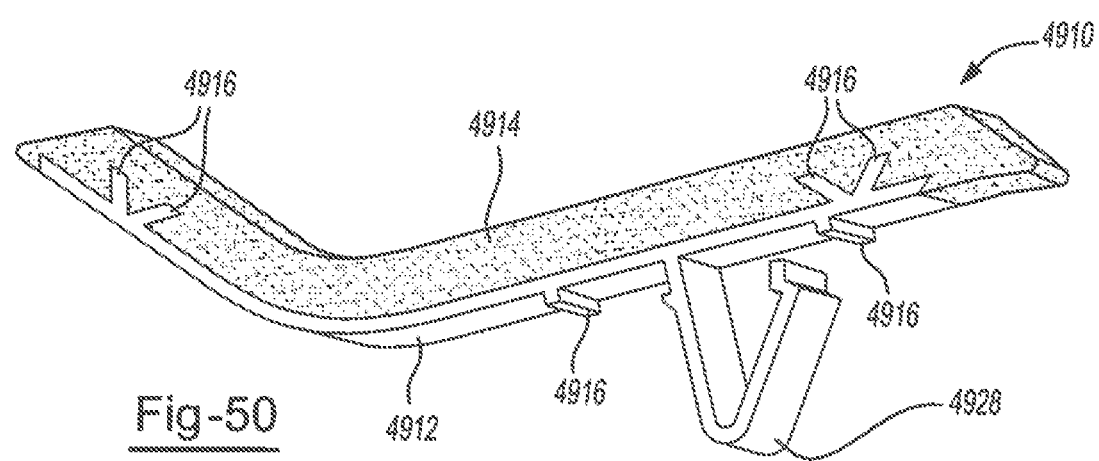
Fig-50

MEMBERS FOR SEALING, BAFFLING, OR REINFORCING

FIELD OF THE INVENTION

The present invention relates generally to a member, which is employed for providing sealing, noise/vibration reduction, structural reinforcement or a combination thereof.

BACKGROUND OF THE INVENTION

Industries, such as the automotive industry, rely on devices for baffling, sealing, or reinforcing. Such members typically include an activatable material, such as an expandable material, which may be combined with other components for forming a seal, a baffle, a structural reinforcement or the like in a cavity, such as cavity of an automotive vehicle. U.S. Pat. Nos. 7,784,186; 7,249,415; 5,755,486; 4,901,500; and 4,751,249, each of which is incorporated by reference, describe exemplary prior art devices for baffling, sealing, or reinforcing. There is a continuous need in the industry to provided improved devices which provide for better installation within varying tolerances, more rapid activation of the activatable material, and provide for installation in a variety of cavity configurations.

SUMMARY OF THE INVENTION

The present disclosure relates to an article comprising: a carrier; activatable material disposed on the carrier; and one or more carrier extensions extending from the carrier; wherein the article is adapted to provide sealing, baffling, or reinforcement within a structure's cavity.

In some preferred embodiments, the article of the disclosure may include one or more activatable material extensions. In some preferred embodiments, the article of the disclosure may include at least one hinge. In some preferred embodiments, the article of the disclosure may include one or more fasteners. In some preferred embodiments, the article may include a receiving channel. In some preferred embodiments one or more fasteners may be located in a differing plane from at least one other fastener.

The disclosure further relates to a method of forming the article and a method of using the article.

The article of the disclosure is able to be inserted into a cavity, such as a vehicle cavity. The article of the disclosure is able to adapt to varying tolerances within the cavity. The article of the disclosure provides for more rapid activation of activatable material.

BRIEF DESCRIPTION OF THE DRAWINGS

FIG. 3 is a section view of an exemplary member according to the teachings herein.

FIG. 4 is a perspective view of an exemplary member according to the teachings herein.

FIG. 5 is a section view of an exemplary member within a cavity according to the teachings herein.

FIGS. 7A and 7B are section views of an exemplary member having at least one hinge according to the teachings herein.

FIG. 23 is a perspective view of an exemplary member according to the teachings herein;

FIG. 24 is a section view of an exemplary member according to the teachings herein;

FIG. 25 is a section view of an exemplary member according to the teachings herein;

FIG. 26 is a section views of an exemplary member according to the teachings herein;

FIG. 27 is a perspective view of an exemplary member according to the teachings herein;

FIG. 47 is a section view of an exemplary member according to the teachings herein;

FIG. 48 is a perspective view of an exemplary member according to the teachings herein;

FIG. 49 is a section view of an exemplary member according to the teachings herein;

FIG. 50 is a perspective view of an exemplary member according to the teachings herein;

DETAILED DESCRIPTION

Figure 1:
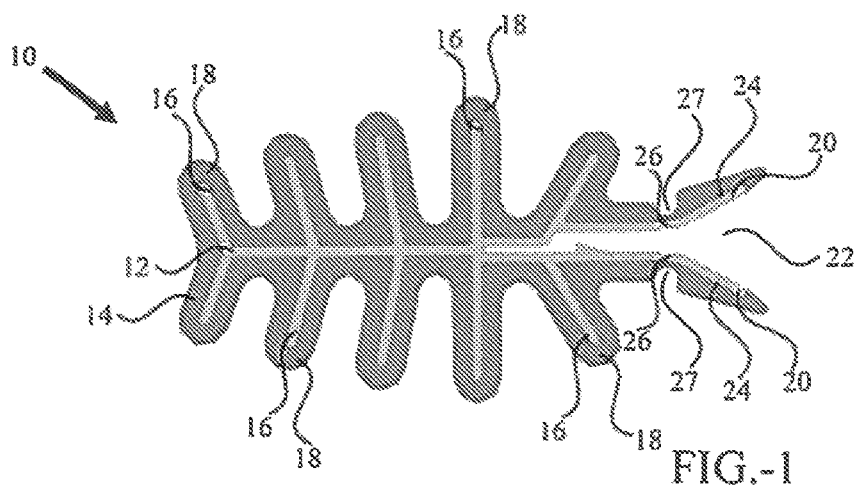
FIG. 1 is a section view of an exemplary member capable of receiving a portion of the cavity according to the teachings herein.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Nos. 62/154,778, filed Apr. 30, 2015; and 62/270,663, filed Dec. 22, 2015, the entirety of the contents of these applications being hereby incorporated by reference for all purposes. The present teachings relate to an article which may be a member for providing baffling, sealing, reinforcing, or a combination thereof to an article of manufacture. The member may include a carrier; activatable material disposed on the carrier; and one or more carrier extensions extending from the carrier. The member may specifically be adapted to provide sealing, baffling or reinforcement within a structure's cavity. It is contemplated that the member may be applied (e.g., assembled) to various articles of manufacture such as boats, trains, buildings, homes, furniture, or the like. It has been found however, that the member is particularly suitable for application to automotive vehicles.

The article of the disclosure may further comprise any one or more of the features described in this specification in any combination, including the preferences and examples listed in this specification, and including the following features: one or more activatable material extensions may extend from the activatable material; one or more carrier extensions may extend into the activatable material; the carrier may include at least one hinge portion so that the carrier is flexible; the carrier may be comprised of a pliable material; the carrier may include one or more fasteners; portions of the carrier may be located in different planes from one another; at least one fastener may be located in a differing plane from at least one other fastener; the activatable material may be at least partially disposed on at least one fastener; the carrier may form a circle or a portion of a circle; the one or more carrier extensions may extend outward radially from the carrier; the carrier my split into two distinct portions; the carrier may include a receiving channel; the activatable material may have a curved profile; the activatable material may extend beyond an end of the carrier; the activatable material may be disposed on the carrier between one or more carrier extensions.

The carrier may have a longitudinal axis. The carrier may include one or more extensions. The one or more extensions may extend from a central portion of the carrier, which central portion may be in substantial alignment with the longitudinal axis. The one or more extensions may be arranged in a substantially perpendicular arrangement with the central portion of the carrier. Alternatively, the one or more extensions may extend from the central portion of the carrier at a skew angle. The carrier may include extensions that extend at both skew and perpendicular angles. The central portion of the carrier may bisect the one or more extensions. The central portion of the carrier may split into two distinct split portions where said split portions may be substantially parallel to one another or may be arranged in a non-parallel relationship. The split portions may be located at a terminating end of the carrier. The split portions may be formed such that they act as a fastener for locating the carrier in a desired location such that the split portions are located into and/or through an opening. The activatable material maybe located onto substantially the entirety of the carrier or alternatively may be located onto only portions of the carrier. The activatable material may substantially entirely enclose the entirety of the carrier. Alternatively, the activatable material may substantially enclose only portions of the carrier. The activatable material may be located onto any portion of the carrier that forms a fastener. The activatable material may substantially enclose any portion of the carrier which forms a fastener. Any portion of the carrier which forms a fastener may also be substantially free of any activatable material.

The carrier may include a plurality of fasteners which may be integrally formed with the carrier or separately formed from the carrier. The carrier may be flexible and thus may be formed to facilitate movement of the carrier along more than one axis. Portions of the carrier may be located in different planes from one another. A carrier including multiple fasteners may be formed so that a first fastener is located in a first plane and a second fastener is located in a second plane that is different from the first plane. The carrier may include one or more curved portions. The carrier may include hinge portions to facilitate flexing or may alternatively be substantially free of any hinge portions such that flexing is facilitated by the pliable material used to form the carrier and the material thickness. The plurality of fasteners may be arranged parallel to one another. The plurality of fasteners may be arranged such that a first fastener may be perpendicular to a second fastener. The carrier may have sufficient flexibility so that prior to insertion into openings, a first fastener and second fastener may be located parallel to one another (e.g., in a first position relative to each other), but during use and upon insertion into openings, the first and second fasteners are located in a non-parallel relationship relative to each other (e.g., in a second position relative to each other). The carrier may be arranged in an "M" shape. The carrier may be substantially continuous including no free end portions or one or less end portions. The carrier may include a t-shaped portion. The carrier may include a plurality of t-shaped portions. The carrier may include opposing t-shaped portions. The carrier may include an activatable material which may be located only onto select portion of the carrier. The activatable material may substantially enclose the entirety of the carrier. The activatable material may be located onto the fasteners. Alternatively, the fasteners may be substantially free of any activatable material located thereon.

The carrier may include one or more fasteners that are located so that they correspond with openings formed in a wall. The carrier may include a plurality of fasteners located adjacent one another to be located into a plurality of adjacent wall openings. The carrier may be formed so that a first portion of the carrier includes activatable material located on only a single surface of the carrier, whereas a second portion of the carrier is substantially surrounded by the activatable material. The carrier may include portions having a material thickness that is greater than the material thickness at other portions of the carrier. The portions having a greater thickness may be arranged in a position that is substantially parallel to or substantially perpendicular to a portion having a smaller thickness. The activatable material may extend beyond an end of the carrier. Alternatively, the activatable material may be substantially coextensive with an end of the carrier.

The carrier may include a portion that is curved. The curved portion may form a circle or a portion of a circle. Any extensions extending from the carrier may extend from a curved portion. The extensions may be substantially planar or may include a curved portion. The carrier may be curved and may include a plurality of extensions that extend outward radially from the carrier. A fastener may be included on one or more of the extensions. Alternatively, a fastener may extend from the carrier in a location that is distinct from the extensions. The fastener may extend in a direction that opposes one or more of the extensions. The fastener may be located adjacent an extension that opposes the remaining extensions. The activatable material may be located onto one surface of the carrier or onto multiple surfaces of the carrier. The activatable material may be located onto at least one surface of one or more extensions. The activatable material may be located onto exactly one surface of each extension. The fastener may include a first portion that rests adjacent an opening such that the first portion does not enter into the opening. The first portion of the fastener may be shaped so that it is too large to fits through an opening. The fastener may include a second portion that is located into and/or through an opening.

The carrier may include one or more hinge portions. One or more of the hinge portions may be free of any bending along the hinge until pressure is applied to one or more carrier portions adjacent the hinge portion. The hinge portions may be formed by portions of the carrier having a thinner cross section than adjacent portions of the carrier. The hinge portions may be formed by portions of the carrier that have a preformed curved shape. The hinge portions may include a fastener. The carrier may include a single hinge portion or may include a plurality of hinge portions. The carrier may be formed so that it is substantially planar until it is located into contact with one or more wall structures causing the carrier to form a shape that corresponds to the shape of the wall structures whereby the hinge portions facilitate the forming.

The activatable material itself may be formed to have a curved profile. In the event that the activatable material is not co-extensive with the carrier, the activatable material that extends beyond an end of the carrier may be curved. Any angle of curvature for one or more of the carrier and activatable material may be selected based upon the intended location of the device which may depend upon the shape of a cavity into which the device is to be located. The carrier and/or activatable material may be curved in a single direction or may be curved in multiple directions. The curve may form a substantially u-shaped or substantially v-shaped device.

At least a portion of the carrier may have a thin profile (e.g., a profile that is thinner than adjacent portions of the carrier). The thin profile portion may be such that it can be located in areas where the surface upon which the carrier is located must remain substantially flat. The thin profile portion may be connected to a fastener having a substantially thicker profile such that the thickness of the fastener assists in maintaining the thin profile portion in a flat position on a surface adjacent the fastener. The fastener may be shaped to include surfaces that lie in direct planar contact with a surface that lies adjacent an opening (e.g., an opening into which the fastener is located). The fastener may be an arrowhead fastener whereby one or more terminal ends of the arrowhead include surfaces formed to contact and exert a force on a surface adjacent an opening in wall.

The carrier may include a plurality of adjacent extensions with activatable material located therebetween. The extensions may be of differing length or may be substantially similar in length. A first extension having a first length may be located in between two adjacent second extensions having a length that is shorter than the first lengths. Alternatively, a first extension may have a first length that is shorter than the length of one or more adjacent extensions. The carrier may have extensions that extend away from one another or toward one another. The area between one or more extensions may be substantially free of any activatable material. Alternatively, the area between one or more extensions may be substantially filled with activatable material, or may be only partially filled with activatable material.

The carrier may be formed into an L-shape. An L-shaped carrier may include a fastener that extends from either side of the 'L'. The carrier may include portions that form a y-shape and also portions that form a t-shaped. The y and t shape portions may substantially oppose one another. A fastener may extend from the t portion, the y portion, or both the y portion and t portion. The carrier may include a fastener located at a central location along the carrier. The portion of the carrier adjacent the fastener may have a thinner cross section than other portions of the carrier. The portion of the carrier adjacent the fastener may have a cross section that is thicker than other portions of the carrier. A first side of the carrier adjacent the fastener may have a thinner cross section than a second side of the carrier adjacent the fastener.

The carrier may have fasteners located at one or more terminating ends of the carrier. The carrier may include exactly two terminating ends and exactly two fasteners, one located at each terminating end. The carrier may have two fasteners located in a central portion of the carrier. The carrier may include two fasteners and both fasteners are located toward one side or end of the carrier.

The carrier may be c-shaped with curved edges or c-shaped with square edges. The carrier may have a serpentine or s-shape. The carrier may have a u-shaped, whereby the activatable material is not co-extensive with one or more ends of the carrier. The carrier may form a square. The activatable material may be located along the outside of the square, along the inside of the square or along both the outside and inside of the square. The carrier may be formed as a full square or as a partial square. The carrier may be formed as concentric circles or as portions of concentric circles. The activatable material may be located between the concentric circles. The activatable material may be located on only one surface of each concentric circle or on multiple surfaces of each concentric circle. The carrier may be substantially L-shaped and may include activatable material located surrounding the entirety of the carrier. The carrier may be formed as adjacent circles, each circle including one or more extensions or alternatively no extensions at all. The carrier may be formed as two opposing t-shaped portions.

Formation of the member of the disclosure may include a variety of processing steps depending on the desired configuration of the member. In any event, it is generally contemplated that the carrier and the activatable material may be manually attached to each other, automatically attached to each other, or a combination thereof. Moreover, various processes such as molding (e.g., compression, injection, or other molding), extrusion, pultrusion, or the like may be used to form the carrier, the activatable material, the one or more fasteners, the one or more carrier extensions, the one or more activatable material extensions, and such processes may be employed to attach these components together. One or more of the carrier and/or activatable material may be formed in processes disclosed in U.S. Provisional Application No. 62/074,237, incorporated by reference herein for all purposes.

The method of forming the member of the disclosure may comprise providing a carrier material and extruding and/or pultruding an activatable material on at least a portion of the carrier material, whereby the activatable material may be co-extruded and/or pultruded with the carrier material.

The method of forming the member of the disclosure may further comprise any one or more of the following steps or features described in this specification in any combination, including the preferences and examples listed in this specification, and including the following: the method may include installing the member into the cavity, such as a vehicle cavity; the method may comprise activating the activatable material so that it expands and substantially fills the cavity; the carrier material may be provided by extrusion; the carrier material may be simultaneously extruded with the activatable material; the activatable material and/or the carrier material may be further extruded to form a profile configuration; and the one or more fasteners may be formed as part of the carrier material or separate from the carrier material.

The carrier may comprise a polymeric material, a metallic material, or a combination thereof. The carrier may comprise a composite material, a woven material, or a combination thereof. The activatable material may comprise an epoxy. One or more of the carrier material and/or activatable material may comprise a composite article that is formed by contacting an epoxy/amine reaction product material (e.g., a material that is a reaction product of a diepoxide and a primary amine, such as monoethanolamine, or the reaction product of a diepoxide resin (e.g., BPA), a mono primary amine, a di-secondary amine, a dimer captan and/or a di-carboxylic acid) during a step of extrusion, injection molding, pultrusion or any combination thereof. The contacting may be only after the reaction has completed between the epoxy and the amine (e.g., only after the reaction of epoxy and amine), as described in U.S. Provisional Application No. 62/130,908, incorporated by reference herein for all purposes.

FIG. 1 is a section view of an exemplary member capable of receiving a portion of the cavity. The member 10 includes a carrier 12 with an activatable material 14 located thereon. The carrier may include one or more carrier extensions 16. The activatable material 14 may include one or more activatable material extensions 18. The carrier 12 may have a longitudinal axis. The carrier 12 may split into two or more distinct portions along at least a portion of its length. For example, the carrier 12 may split into two end extensions 20 with a receiving channel 22 therebetween. The receiving channel 20 may only extend partially into the carrier 12. For example, the one or more end extensions 20 and the receiving channel 22 may form a U-clip. The receiving channel 22 may receive a panel, flange, or other portion of a cavity. The activatable material 14 may only be disposed on one surface of the end extensions 20, preferably it is disposed on the outer surface 24 opposing the receiving channel 22. The receiving channel 22 may be wider at the opening and narrow as it continues into the carrier 12. A hinge 26 may be formed on each end extension 20. A hinge 27 may be formed on the activatable material 14 disposed on the end extension's 20 hinge 26. The hinges 26, 27 may allow the one or more end extensions 20 to deflect and/or bend as a panel or flange (not shown) is inserted into the receiving channel 22.

Figure 2A:
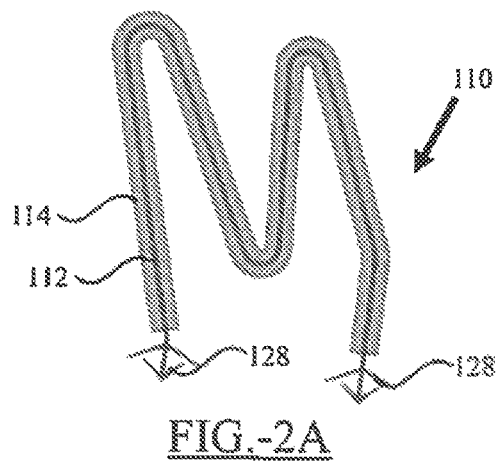
FIGS. 2A, 2B and 2C are section views of exemplary members with multiple fasteners according to the teachings herein.
Figure 2C:
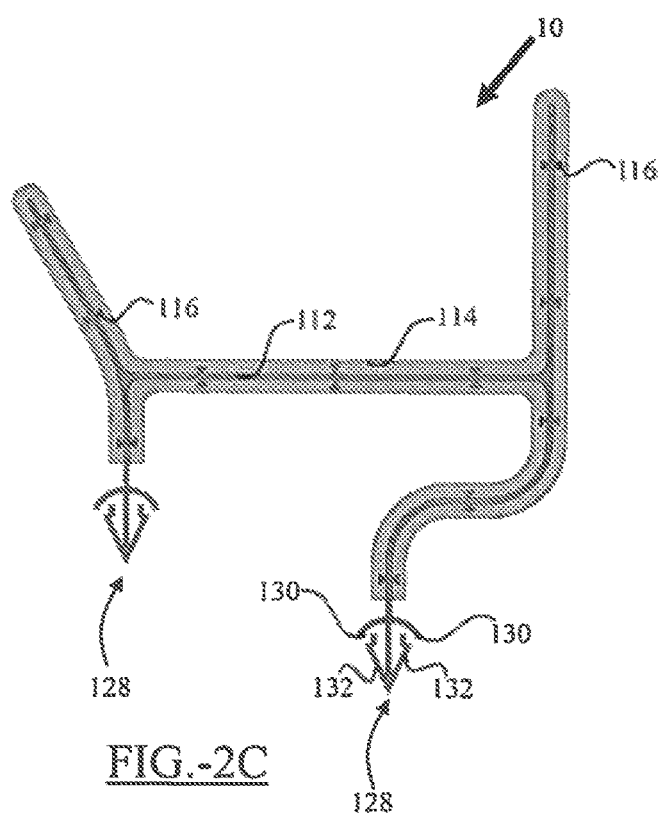
Figure 2B:
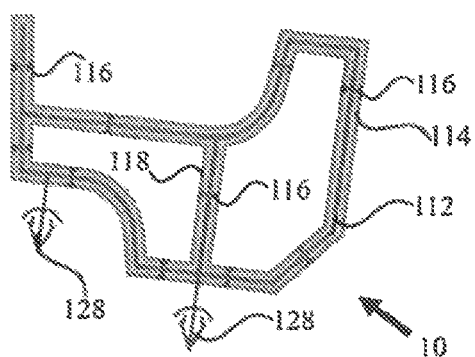

FIGS. 2A, 2B, and 2C illustrate section views of alternative exemplary multi-clip members 110. The member includes a carrier 112 with an activatable material 114 located thereon. The carrier 112 may have portions along multiple axes. The carrier may include one or more carrier extensions 116. The one or more carrier extensions 116 may extend into the activatable material 114. The activatable material may or may not have activatable material extensions (not shown). One or more fasteners 128 may be attached to the member 110, preferably attached to the carrier 12. The one or more fasteners 128 may be integral with the carrier 112 or formed separately from the carrier 112. The fastener 128 may include a pair of first extensions 130 and a pair of second extensions 132. The fasteners 128 may be located in differing axis or planes, such that the member 110 may be installed into a cavity (not shown) with receiving holes (not shown) on walls with differing planes, curved walls, non-planar walls, and the like. The receiving holes (not shown) may having varying distances therebetween due to tolerance ranges. The member 110 may be flexible such that it accommodates varying tolerances in the receiving holes. For example, the carrier 112 may be flexible such that the distances between fasteners 128 may adapt to differing distances between the receiving holes in the cavity.

FIGS. 3, 4, and 5 illustrate another exemplary member 210 which may be inserted within a cavity 234, such as a cavity of an automotive vehicle. FIG. 4 shows that the member 210 is elongated with a carrier 212 and an activatable material 214 located thereon. The carrier 212 may include one or more carrier extensions 216. The activatable material 214 may include one or more activatable material extensions 218. The carrier extensions 216 may extend into the activatable material 214, such as the activatable material extensions 218. The member 210 may be elongated, as illustrated in FIG. 4. One or more fasteners 228 may extend from the carrier 212. The one or more fasteners 228 may be located at a first terminating end and/or second terminating end of the carrier 212. The one or more fasteners 228 may include a first pair of extensions 230. The one or more fasteners 228 may include a second pair of extensions 232. The fastener 228 may use only the first pair of extensions 230, the second pair of extensions 232, or both. The activatable material 214 may be extruded over a portion of the carrier 212. For example, the activatable material extensions 218 may be extruded over the carrier extensions 216. The activatable material 214 may be co-extruded with the carrier 212. In the embodiment as shown, the carrier extensions 216 and activatable material extensions 218 extend along the entire length of the carrier 212. However, it is contemplated that the carrier extensions 216, the activatable material extensions 218, or both the carrier extensions 216 and the activatable material extensions 218 may be intermittent along the length of the carrier 212.

Figure 6A:
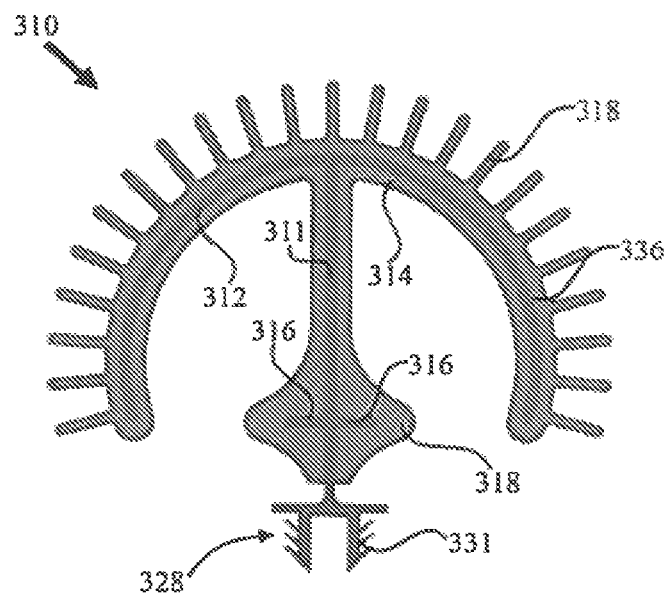
FIGS. 6A and 6B are section views of exemplary members with a partially circular carrier according to the teachings herein.
Figure 6B:
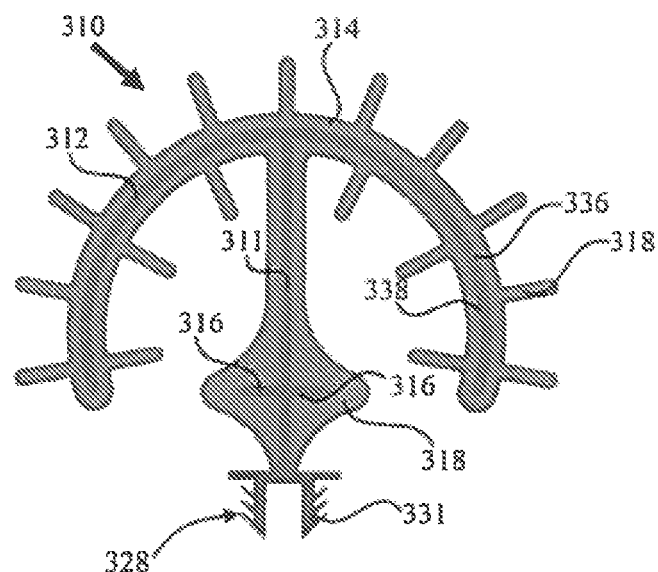
Figure 8:
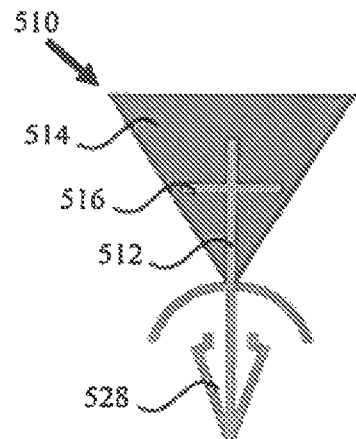
FIGS. 8 through 13 are section views of exemplary members with activatable material in a variety of configurations disposed on the carrier according to the teachings herein.

FIGS. 6A and 6B illustrate section views of alternative exemplary members 310 with a partially circular carrier 312. The member 310 may include a carrier 312 and activatable material 314 thereon. The carrier 312 may have a circular cross-section, rectangular cross-section, or any other suitable shape for providing baffling, sealing, or reinforcement. A base section 311 may extend from the carrier 312. The carrier 312 may be partially circular, arched, have a radius, or curve along its length. For example 312, the carrier 312 may partially encircle about the base section 311. The carrier may include one or more carrier extensions 316. One or more carrier extensions 316 may extend from the carrier base section 311. The activatable material 314 may be placed on the one or more portions of the carrier 312. The activatable material 314 may include activatable material extensions 318. The activatable material 314 may be located on the carrier base portion 311 and the carrier 312. The activatable material extensions 318 may be disposed on the carrier extensions 316, such as the carrier extensions 316 extending from the base portion 311. The activatable material extensions 318 may extend from activatable material 314 disposed on the carrier 312, such as in the shape of fins. The activatable material extensions 318 may have one or more carrier extensions 316 therethrough or may be free of the one or more carrier extensions 316. If the carrier 312 has a rectangular cross-section, the activatable material extensions 318 may extend from the activatable material 314 located on a first surface of the carrier 312, as shown in FIG. 6A. If the carrier 312 has a circular cross-section, the activatable material extensions 318 may extend outward radially from just a portion of the surface of the activatable material 314 located on the carrier 312, as shown in FIG. 6A. The activatable material extensions 318 may extend from the activatable material 314 located on multiple surfaces of the carrier 312, such as both the first surface and second surface of the carrier 312, if the carrier 312 includes a rectangular cross-section, as shown in FIG. 6B. The activatable material extensions 318 may extend radially outward along the entire outer diameter of carrier 312, if the carrier 312 has a circular cross-section, as shown in FIG. 6B. The activatable material extensions 318 may be located across from one another, as shown, or in an alternating pattern. The partially circular carrier 312, the carrier extensions 316, the activatable material extensions 318, or a combination thereof, may provide for more rapid activation of the activatable material 314. For example, if the activatable material 314 is heat activated, the dispersion of the activatable material extensions 318 allow the activatable material 314 to reach an activation temperature more rapidly than if the activatable material 314 were placed in a solid, continuous manner along the length of the carrier 312. The activatable material 314 may be extruded over the carrier 312 or may be co-extruded with the carrier 312. The carrier may include one or more fasteners 328. The fastener 328 may include barbs 331 for retaining the fastener to a wall, panel, or other surface. The barbs 331 may engage with a receiving hole (not shown). The one or more fasteners 328 may be integral with the carrier 312. The carrier 312 may split into two or more portions along at least a portion of its length. For example, the carrier 312 may be split into two sections along the length of the one or more fasteners 328.

FIGS. 7A and 7B illustrate a cross-section of exemplary member 410 which may be hinged. The exemplary member includes a carrier 412 and activatable material 414 disposed thereon. The carrier 412 may include one or more carrier extensions 416. The carrier extensions 416 may at least partially extend into the activatable material 414. The carrier 412 may include one or more hinges 440, 442. A first hinge 440 may allow the carrier 412 to bend along its length. For example, the first hinge 440 may allow the carrier 412 to form a right angle as illustrated in FIG. 7B. A second hinge 442, may allow the carrier 412 to bend along its length. For example the second hinge 442 may allow the carrier to form an acute angle as illustrated in FIG. 7B. The first hinge 440, the second hinge 442, or both hinges may allow the carrier to bend at an angle of at least 90 degrees or more such as to form a 90 degree angle or a smaller, acute angle. The member 410 may include a fastener 444 for retaining the member 410 in a hinged position. The member 410 may include an opening 446 for receiving and engaging the fastener 444. The member 410 may include a clip 448 for affixing the exemplary member 410 to a structure, such as within a vehicle cavity (not shown). The clip 448 may extend from the carrier 412. The clip 448 may designed as a pen clip which receives a portion of a panel, structure, flange, or the like. The clip 448 be receiving a structure (not shown) may retain the member 410 within a cavity (not shown).

Figure 9:
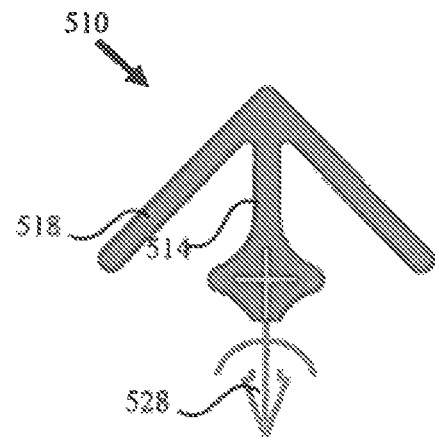
Figure 10:
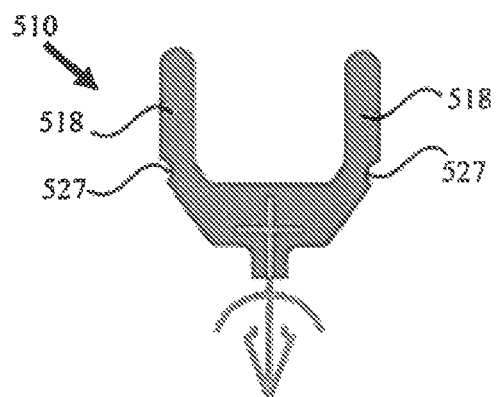
Figure 11:
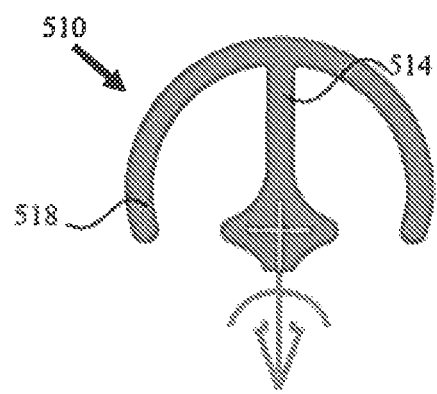
Figure 12:
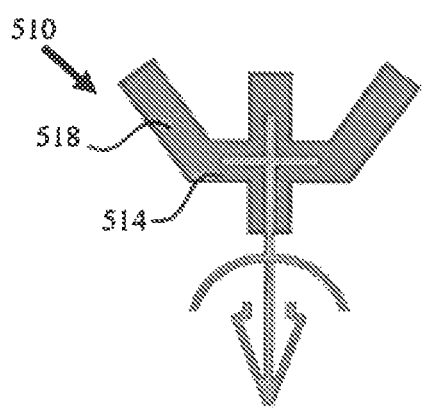
Figure 13:
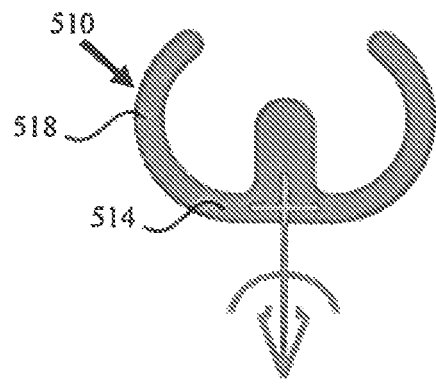

FIGS. 8-13 illustrate exemplary member 510 having a variety of activatable material 514 configurations. The exemplary member includes a carrier 512 and activatable material 514 disposed thereon. The carrier 512 may include carrier extensions 516. The carrier 512 may include one or more fasteners 528. The activatable material 514 may include activatable material extensions 518. The carrier 512 may be flexible, the activatable material 514 may be flexible, or both the carrier 512 and the activatable material 514 may be flexible. The carrier 512, the activatable material 514 or both may include one or more hinges. For example, the activatable material 514 may include one or more hinges 527 on the activatable material extensions 518 as shown in FIG. 10. The activatable material 514 may have a varying thickness along the length of the member 510. The activatable material 514 may extend away from the carrier 512, such that the carrier 512 does not provide support for portions of the activatable material 514. The activatable material 514, and the activatable material extensions 518, may be partially circular, as shown in FIG. 11 and FIG. 13. The activatable material 514 may include c-shaped sections, such as in FIG. 11 and FIG. 13. The activatable material 514 may include u-shaped sections, such as in FIG. 10. The activatable material 514 may increase in width as it extends away from the carrier 512, such as in FIG. 8. The activatable material extensions 518 may extend from the activatable material 514 in an L-shape or at an angle greater or less than 90 degrees, such as shown in FIG. 9 and FIG. 12.

Figure 14:
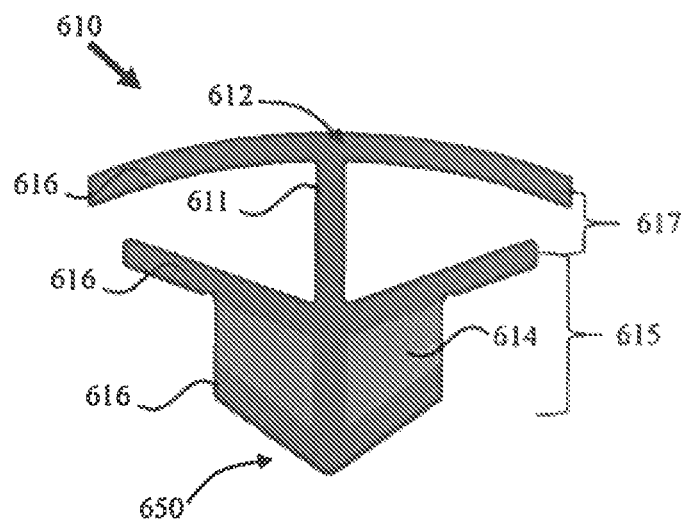
FIGS. 14 through 16 are section views of exemplary members able to pass through multiple surfaces according to the teachings herein.
Figure 15:
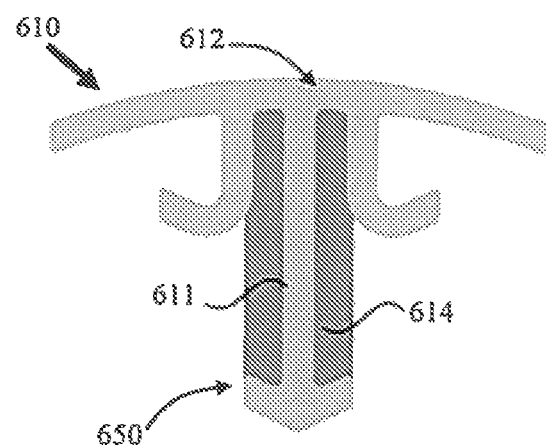
Figure 16:
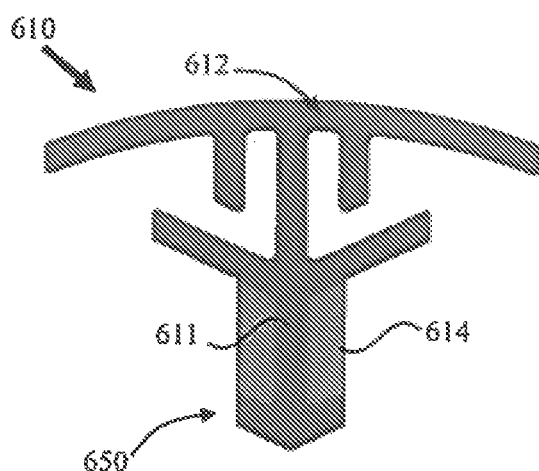

FIGS. 14-16 illustrate varying configurations of exemplary member 610. The exemplary member 610 includes a carrier 612 and activatable material 614 disposed thereon. The carrier 612 may include a base portion 611, carrier extensions 616, or both. The activatable material 614 may be disposed on the base portion 611, for example on the base portion 611 and in between carrier extensions 616. The exemplary member 610 may be able to pass through one surface or multiple surfaces. The exemplary member 610 may be able to retain to one surface or multiple surfaces. For example, the exemplary member 610 may go through a first surface and a second surface, by inserting the bottom portion 650 through an opening and applying force to the exemplary member 610. The exemplary member may retain a first surface (not shown) or multiple surfaces between a first set of carrier extensions 615. The exemplary member may retain a second surface (not shown) or multiple surfaces between a second set of carrier extensions 617.

Figure 17:
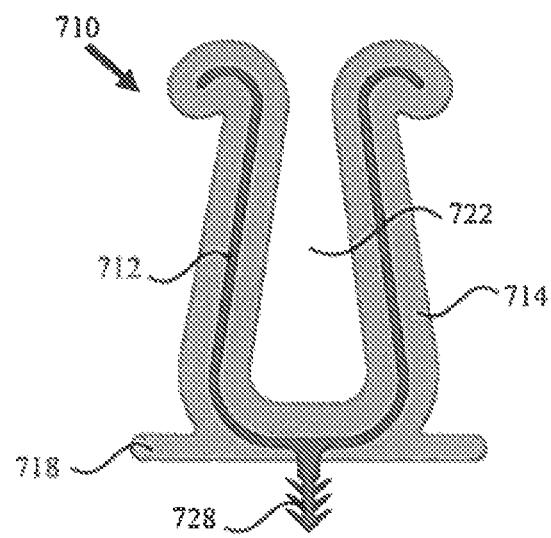
FIG. 17 is a section view of an exemplary member having a U-clip according to the teachings herein.

FIG. 17 illustrates an exemplary member 710 in a U-Clip configuration. The exemplary member 710 includes a carrier 712 and activatable material 714 disposed thereon. The exemplary member 710 may be able to receive a member, such as a flange, panel, or the like. For example, the carrier 712 may be formed in a U-shape. The carrier 712 may include a receiving channel 722. The exemplary member 710 may be able to be fastened or secured to a member, such as a panel, cavity wall, or the like. For example, a fastener 728 may extend from the carrier 712. The fastener 728 may be adapted to fit in an opening of a panel, cavity wall, or the like. The activatable material 714 may include activatable material extensions 718 extending away from the carrier 712. For example, the exemplary member 710 may include activatable material extensions 718 extending away from the carrier 712 between the base of the carrier 750 and the fastener 728.

Figure 18:
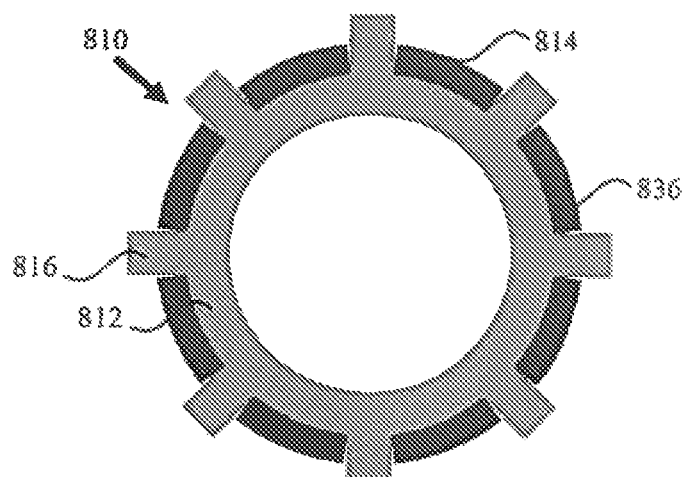
FIG. 18 is a section view of an exemplary member having a circular configuration according to the teachings herein

FIG. 18 illustrates an exemplary member 810 in circular configuration. The exemplary member 810 includes a carrier 812 and activatable material 814 disposed thereon. The carrier 812 may be circular or any other shape best suited to be disposed with a cavity (not shown). The carrier 812 may be solid, hollow, or a combination of both. Preferably, the carrier 812 is hollow to provide for a lighter weight member 810. The carrier 812 may include carrier extensions 816. The carrier extensions 816 may be designed as ribs, fins, barbs, or the like. The carrier extensions 816 may completely or partially encircle the carrier 812. The carrier extensions 816 may extend outward radially from the carrier 812. The carrier extensions 816 may be continuous along the length of the carrier 812 or may be disposed intermittently. The activatable material 814 may be disposed on the exterior surface of the carrier 812. For example, the activatable material 814 may be disposed on the carrier 812 between the carrier extensions 816, on the carrier extensions 816, or a combination of both. Preferably, the activatable material 814 is disposed between the carrier extensions 816 on the carrier 812. Preferably, the activatable material 814 is disposed on the outer surface 836 of the carrier 812.

Figure 19:
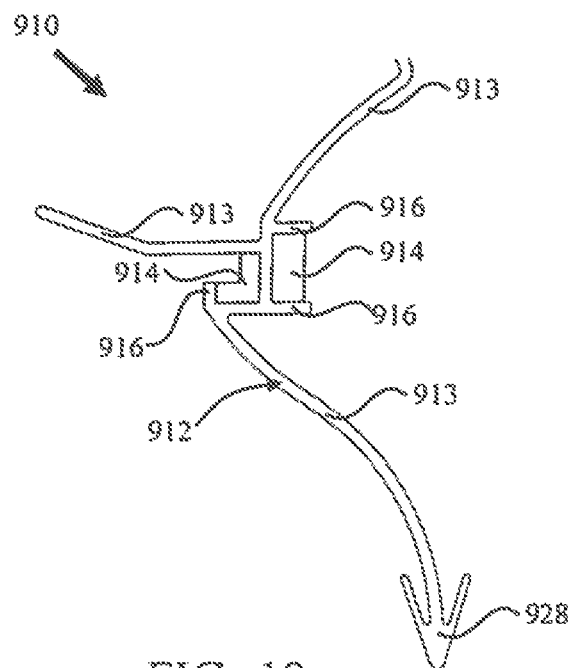
FIG. 19 is a section view of an exemplary member with multiple axes according to the teachings herein.

FIG. 19 illustrates an exemplary member 910 having a carrier 912 with multiple axes. The member 910 includes a carrier 912 with activatable material 914 disposed thereon. Portions of the carrier may extend away from the member's 910 center in differing directions, planes, and/or axes. The carrier 912 may include one or more carrier extensions 916. The one or more carrier extensions 916 may extend from the center of the carrier 912. The activatable material 914 may be disposed on the carrier 912 between one or more carrier extensions 916. The carrier 912 may include one or more fasteners 928.

Figure 20:
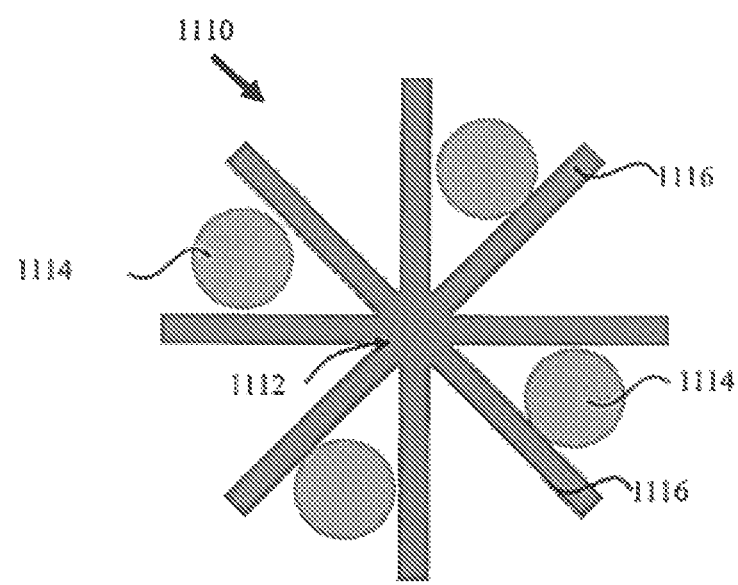
FIG. 20 is a section view of an exemplary member with multiple axes according to the teachings herein.

FIG. 20 illustrates an exemplary member 1110 extending along multiple axes. The member 1110 includes a carrier 1112 with activatable material 1114 disposed thereon. The carrier 1112 may include carrier extensions 1116 that extend away from the center of the carrier 1112. The carrier extensions 1116 may extend outward radially from the center of the carrier 1112. The activatable material 1114 may be disposed in between two or more of the carrier extensions 1116. The activatable material 1114 may be disposed in a circular or spherical shape.

Figure 21:
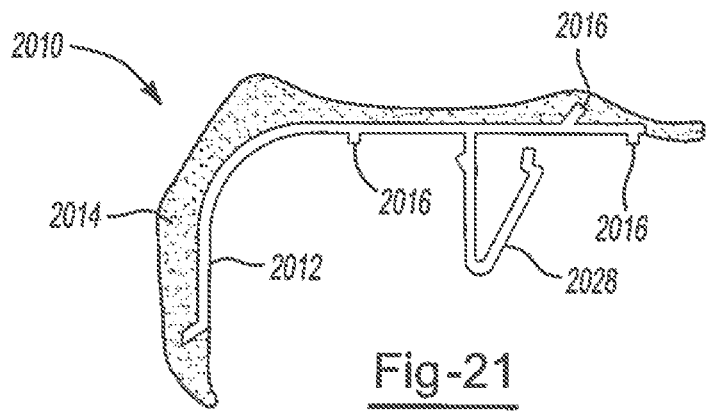
FIG. 21 is a section view of an exemplary member according to the teachings herein.

FIG. 21 illustrates a section view of an exemplary member in a substantially L-shaped configuration. The member 2010 includes a carrier 2012 with an activatable material 2014 located thereon. The carrier 2012 may include a curved portion. The carrier 2012 may include portions that form an L-shape. The carrier 2012 may include one or more carrier extensions 2016. The one or more carrier extensions 2016 may extend into the activatable material 2014. The activatable material 2014 may have one or more curved portions. The activatable material 2014 may extend beyond an end of the carrier 2012. The carrier 2012 may include one or more fasteners 2028. The one or more fasteners 2028 may be integrally formed with the carrier 2012.

Figure 22A:
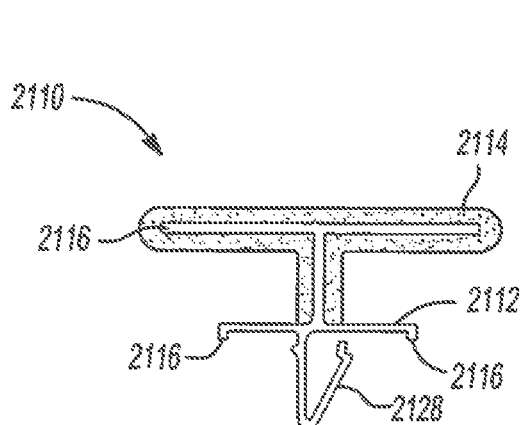
FIGS. 22A, 22B, 22C and 22D are section views of exemplary members according to the teachings herein.
Figure 22B:
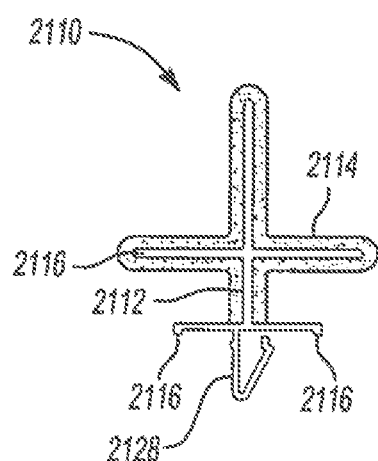
Figure 22C:
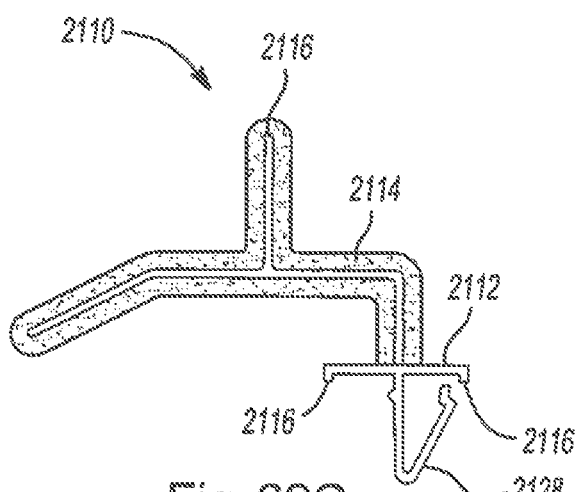
Figure 22D:
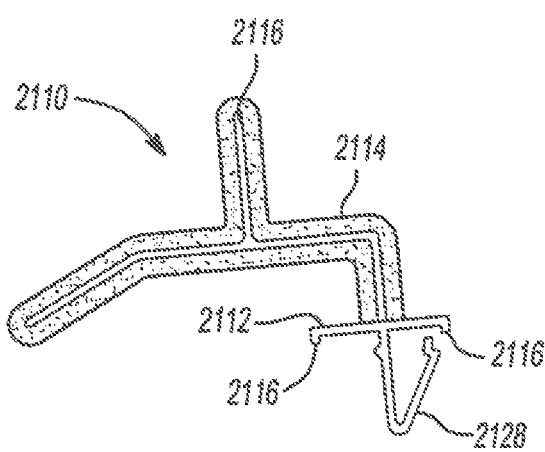

FIGS. 22A, 22B, 22C and 22D illustrate section views of exemplary members which include one or more T-shaped portions. The member 2110 includes a carrier 2112 with an activatable material 2114 located thereon. The carrier 2112 may include portions that form a T-shape. The carrier 2112 may include one or more carrier extensions 2116. The one or more carrier extensions 2116 may extend into the activatable material 2114. The activatable material 2114 may substantially entirely enclose the entirety of the carrier 2112. The carrier 2112 may include one or more fasteners 2128. The one or more fasteners 2128 may be integrally formed with the carrier 2112. The carrier 2112 may include a fastener 2128 located at a central location along the carrier 2112 as shown in FIGS. 22A and 22B. The carrier 2112 may include a fastener 2128 located at one end of the carrier 2112 as shown in FIGS. 22C and 22D. The fastener 2128 may have a substantially thicker profile than the carrier 2112 as shown in FIG. 22D.

FIG. 23 illustrates a perspective view of an exemplary member 2210 with activatable material 2214 located along the entirety of one surface and along a portion of another surface of the carrier 2212. The carrier 2212 may include one or more curved portions. The carrier 2212 may include one or more carrier extensions 2216. The activatable material 2214 may have a curved profile. The carrier 2212 may include a plurality of fasteners 2228 which may be integrally formed with the carrier 2212. The one or more fasteners may be located in a differing plane from at least one other fastener 2228.

FIG. 24 illustrates a section view of an exemplary member 2310 with activatable material 2314 located along one surface of the carrier 2312 and extending beyond both ends of the carrier 2312 in opposing directions. The carrier 2312 may include one or more curved portions. The carrier 2312 may include one or more carrier extensions 2316. The carrier extensions 2316 may extend at both skew and perpendicular angles. One or more carrier extensions 2316 may extend into the activatable material 2314. The activatable material 2314 may include activatable material extensions 2318 which may extend beyond the ends of the carrier 2312. The activatable material extensions 2318 may differ in shape from the activatable material located on the carrier 2312. The carrier 2312 may include one or more fasteners 2328. The one or more fasteners 2328 may be integrally formed with the carrier 2312. The carrier may include a fastener 2328 located at a central location along the carrier 2312.

FIG. 25 illustrates a section view of an exemplary member with L-shaped portions. The member 2410 includes a carrier 2412 with an activatable material 2414 located thereon. The carrier 2412 may include portions that form an L-shape. The carrier 2412 may include one or more carrier extensions 2416. The one or more carrier extensions 2416 may extend into the activatable material 2414. The activatable material 2414 may substantially entirely enclose the entirety of the carrier 2412. The carrier 2412 may include one or more fasteners 2428. The fasteners 2428 may be substantially free of any activatable material 2414 located thereon. The fastener 2428 may be an arrowhead fastener. The fastener 2428 may include barbs 2431 for retaining the fastener to a wall, panel, or other surface. The one or more fasteners 2428 may be integral with the carrier 2412.

FIG. 26 illustrates a section view of an exemplary member with a substantially cross-shaped profile. The member 2510 includes a carrier 2512 with an activatable material 2514 located thereon. The carrier 2512 may include portions that form a T-shape. The carrier 2512 may include one or more carrier extensions 2516. The one or more carrier extensions 2516 may extend into the activatable material 2514. The carrier 2512 may include one or more fasteners 2528. The one or more fasteners 2428 may be integral with the carrier 2512. The fasteners 2528 may be substantially free of any activatable material 2514 located thereon. The fastener 2528 may be substantially U-shaped. The fastener 2528 may include barbs 2531 for retaining the fastener to a wall, panel, or other surface.

FIG. 27 illustrates a perspective view of an exemplary member in a substantially L-shaped configuration. The member 2610 includes a carrier 2612 with an activatable material 2614 located thereon. The carrier 2612 may include one or more curved portions. The carrier 2612 may include one or more carrier extensions 2616. The carrier extensions 2616 may be substantially planar or may include a curved portion. The carrier extensions 2616 may extend at both skew and perpendicular angles. The one or more carrier extensions 2616 may extend into the activatable material 2614. The activatable material 2614 may include one or more activatable material extensions 2618. The carrier 2412 may include one or more fasteners 2628. The fasteners 2628 may be substantially free of any activatable material 2614 located thereon.

Figures 28, 29:
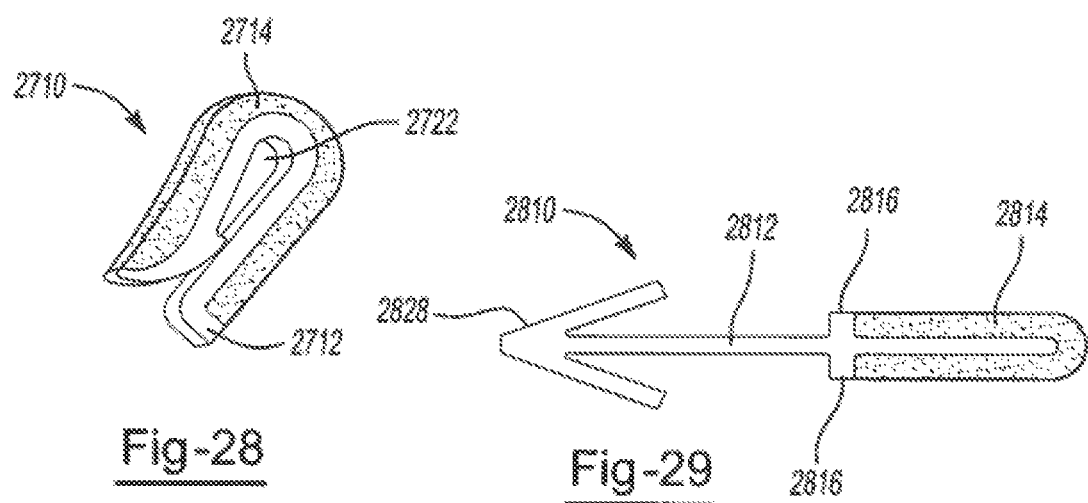
FIG. 28 is a perspective view of an exemplary member according to the teachings herein.
FIG. 29 is a section view of an exemplary member according to the teachings herein.

FIG. 28 illustrates a perspective view of an exemplary member in a substantially U-shaped configuration. The exemplary member 2710 includes a carrier 2712 and activatable material 2714 disposed thereon. The activatable material 2714 may be located onto only the outer surface of the carrier 2712. The carrier 2712 may include a receiving channel 2722.

FIG. 29 illustrates a section view of an exemplary member in a substantially arrow shaped configuration. The member 2810 includes a carrier 2812 with an activatable material 2814 located thereon. The activatable material 2814 may substantially enclose the carrier 2812. The carrier 2812 may include one or more carrier extensions 2816. The carrier 2812 may include one or more fasteners 2828. The fastener 2828 may be an arrowhead fastener.

Figure 30:
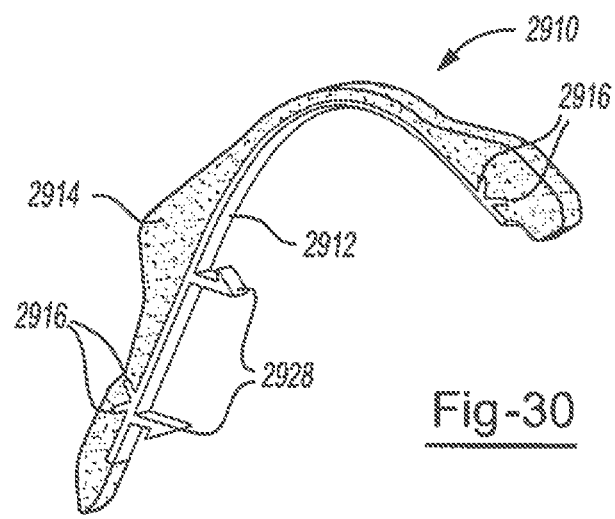
FIG. 30 is a perspective view of an exemplary member according to the teachings herein.

FIG. 30 illustrates a perspective view of an exemplary member with varying thickness along certain portions. The member 2910 includes a carrier 2912 with an activatable material 2914 located thereon. The carrier 2912 may include portions having a material thickness that is greater than the material thickness at other portions of the carrier 2912. The activatable material 2914 may have a varying thickness. The carrier 2912 may include carrier extensions 2916 that extend at skew angles. The carrier 2912 may include a plurality of fasteners 2928. The plurality of fasteners 2928 may be arranged such that a first fastener may be parallel to a second fastener.

Figure 31:
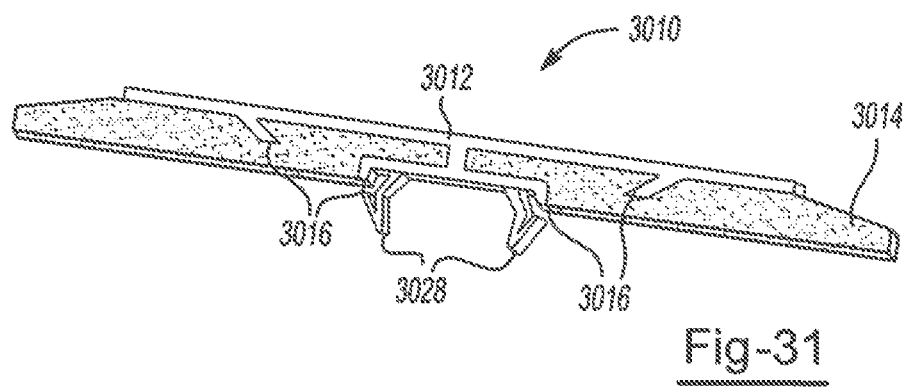
FIG. 31 is a perspective view of an exemplary member according to the teachings herein.

FIG. 31 illustrates a perspective view of an exemplary member with multiple axes. The member 3010 includes a carrier 3012 with an activatable material 3014 located thereon. Portions of the carrier may extend away from the member's 3010 center in differing directions, planes, and/or axes. The carrier 3012 may include one or more carrier extensions 3016. The one or more carrier extensions 3016 may extend into the activatable material 3014. The activatable material 3014 may be disposed on the carrier 3012 between one or more carrier extensions 3016. The carrier 3012 may include one or more fasteners 3028. The one or more fasteners 3028 may be integral with the carrier 3012.

Figures 32A, 32B:
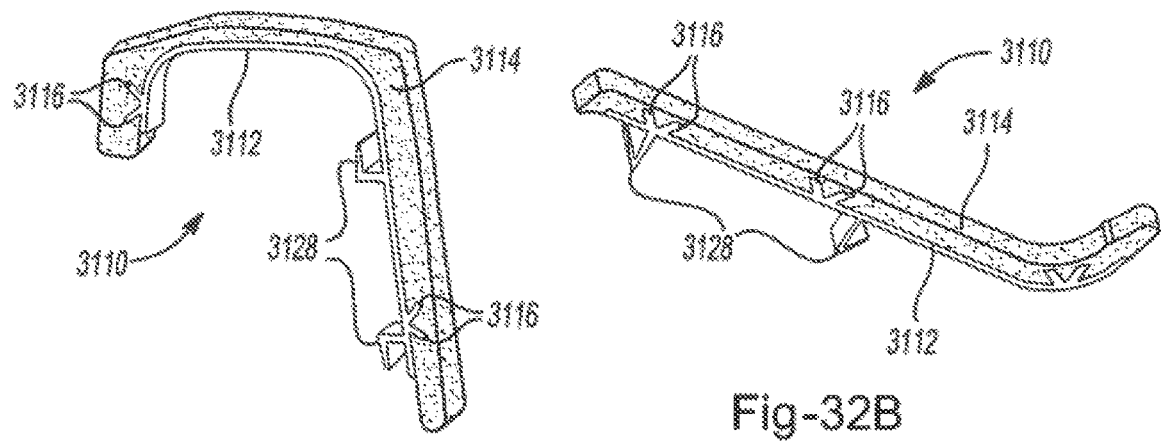
FIGS. 32A and 32B are perspective views of exemplary members according to the teachings herein.

FIGS. 32A and 32B illustrate perspective views of exemplary members 3110 with activatable material 3114 located along one surface of the carrier 3112. The carrier 3112 may include one or more curved portions. The carrier 3112 may include one or more carrier extensions 3116. The carrier extensions 3116 may be located along the ends of the carrier as shown in FIG. 32A. The carrier extensions 3116 may be located along the length of the carrier as shown in FIG. 32B. The carrier extensions 3112 may extend at skew angles. The one or more carrier extensions 3116 may extend into the activatable material 3114. The activatable material 3114 may extend beyond the ends of the carrier 3112. The carrier 3112 may include one or more fasteners 3128. The one or more fasteners 3128 may be integral with the carrier 3112.

Figures 33, 34:
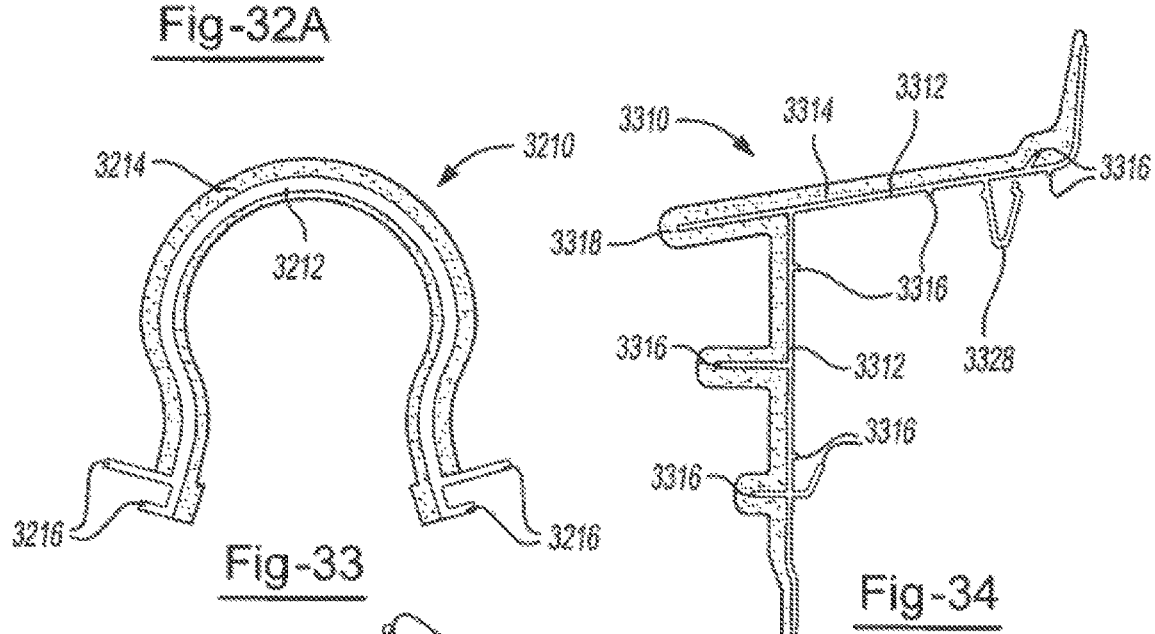
FIG. 33 is a section view of an exemplary member according to the teachings herein.
FIG. 34 is a section view of an exemplary member according to the teachings herein.

FIG. 33 illustrates a section view of an exemplary member in a substantially U-shaped configuration. The exemplary member 3210 includes a carrier 3212 and activatable material 3214 disposed thereon. The activatable material 3214 may be located onto multiple surfaces of the carrier 3212. The activatable material 3214 may have a varying thickness along different surfaces of the carrier 3212. The activatable material 3214 may have a varying thickness along same surfaces of the carrier 3212. The activatable material 3214 may have as a substantially U-shaped profile. The carrier 3212 may include one or more carrier extensions 3216. The one or more one carrier extensions 3216 may be located along the ends of the carrier. The carrier extensions 3216 may be of differing length. The carrier extensions 3216 may be parallel to each other and perpendicular to the carrier 3212. The carrier 3212 may include a receiving channel 3222.

FIG. 34 illustrates a section view of an exemplary member 3310. The exemplary member 3310 includes a carrier 3312 and activatable material 3314 disposed thereon. The carrier 3312 may include one or more carrier extensions 3316. The carrier extensions 3316 may be of differing length. The carrier extensions 3316 may be substantially planar or may include a curved portion. The one or more carrier extensions 3316 may extend into the activatable material 3314. The activatable material 3314 may include one or more activatable material extensions 3318. The activatable material 3314 may have a varying thickness along the carrier 3312. The carrier 3312 may include one or more fasteners 3328. The one or more fasteners 3328 may be integral with the carrier 3312.

Figure 35:
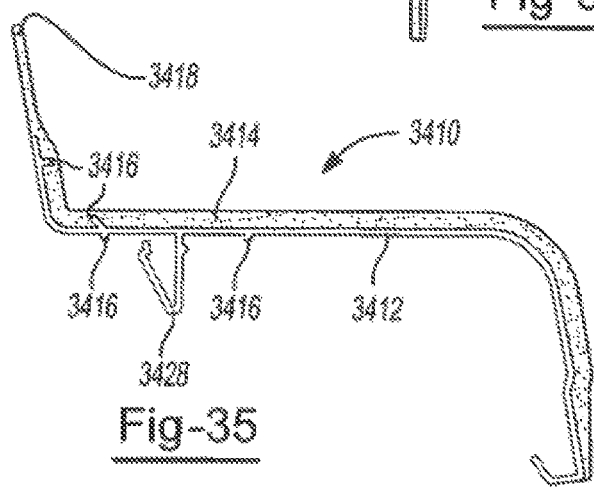
FIG. 35 is a section view of an exemplary member according to the teachings herein.
Figure 36:
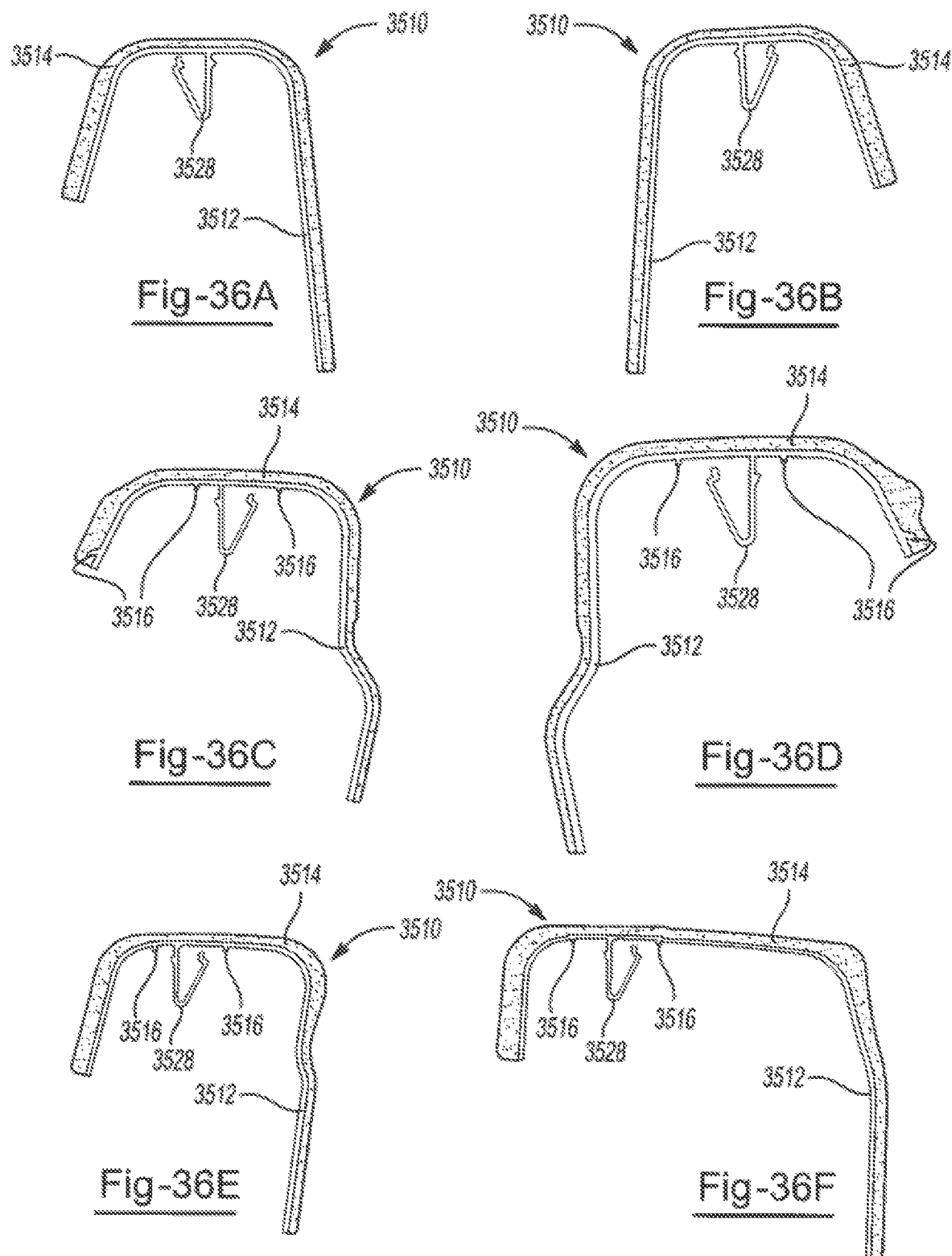
FIGS. 36A, 36B, 36C, 36D, 36E and 36F are section views of exemplary members according to the teachings herein.

FIG. 35 illustrates a section view of an exemplary member 3410 with activatable material 3414 located along one surface of the carrier 3412 and extending beyond an end of the carrier 3412. The carrier 3412 may include one or more curved portions. The carrier may include one or more carrier extensions 3416. The carrier extensions 3416 may be substantially planar or may include a curved portion. The one or more carrier extensions 3416 may extend into the activatable material 3414. A portion of the activatable material 3414 may have a curved profile. The activatable material 3414 may include one or more activatable material extensions 3418. The carrier 3412 may include one or more fasteners 3128. The one or more fasteners 3428 may be integral with the carrier 3412.

FIGS. 36A, 36B, 36C, 36D, 36E and 36F illustrate section views of exemplary members in a substantially J-shaped configuration. The member 3510 includes a carrier 3512 with an activatable material 3514 located thereon. One side of the carrier 3512 may differ in length from the other side of the carrier. The activatable material 3514 may have a varying thickness along the carrier 3512. The carrier 3512 may include one or more carrier extensions 3516 as shown in FIGS. 36C, 36D, 36E and 36F. The carrier 3512 may include one or more fasteners 3528. The one or more fasteners 3528 may be integral with the carrier 3512. The carrier may include a fastener 3528 located at a central or substantially central location along the carrier 3512.

Figure 37:
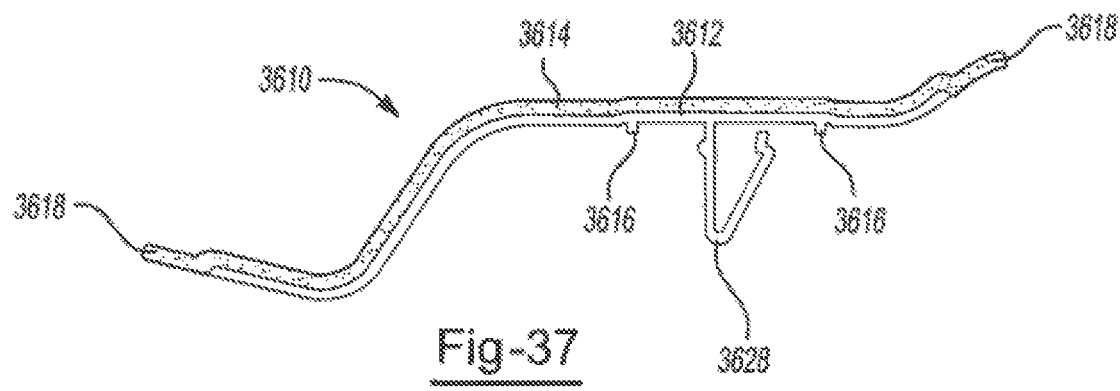
FIG. 37 is a section view of an exemplary member according to the teachings herein.

FIG. 37 illustrates a section view of an exemplary member 3610 with activatable material 3614 located along a surface of the carrier 3612 and extending beyond both ends of the carrier 3612. The carrier 3612 may include one or more curved portions. The carrier 3612 may include one or more carrier extensions 3616. The carrier extensions 3616 may extend at perpendicular angles. The activatable material 3614 may include activatable material extensions 3618 which may extend beyond the ends of the carrier 3612. The carrier 3612 may include one or more fasteners 3628. The one or more fasteners 3628 may be integrally formed with the carrier 3612.

Figures 38, 39:
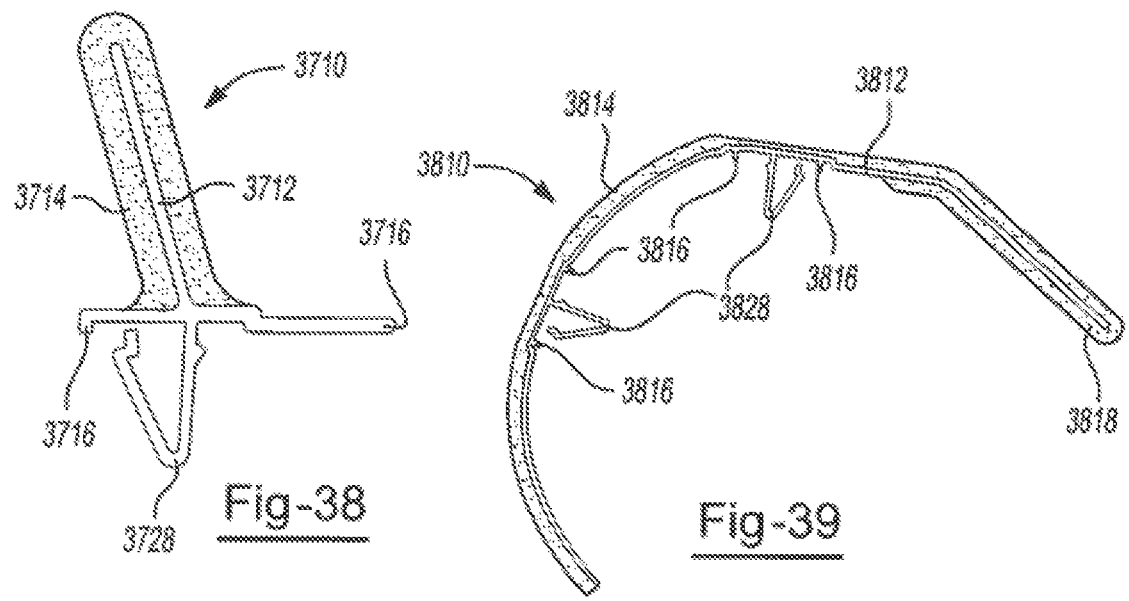
FIG. 38 is a section view of an exemplary member according to the teachings herein.
FIG. 39 is a section view of an exemplary member according to the teachings herein.

FIG. 38 illustrates a section view of an exemplary member 3710 with a varying thickness along certain portions of the carrier 3712. The member 3710 includes a carrier 3712 with an activatable material 3714 located thereon. The carrier 3712 may include one or more carrier extensions 3716. The activatable material 3714 may substantially enclose a portion of the carrier 3712. The carrier 3712 may include one or more fasteners 3728. The one or more fasteners 3728 may be integrally formed with the carrier 3712.

FIG. 39 illustrates a section view of an exemplary member in a substantially C-shaped configuration. The member 3810 includes a carrier 3812 with an activatable material 3814 located thereon. The activatable material 3814 may be located along the entirety of one surface and along a portion of another surface of the carrier 3812. The carrier 3812 may include one or more carrier extensions 3816. The activatable material 3814 may have a curved profile. The carrier 3812 may include a plurality of fasteners 3828 which may be integrally formed with the carrier 3812.

Figure 40:
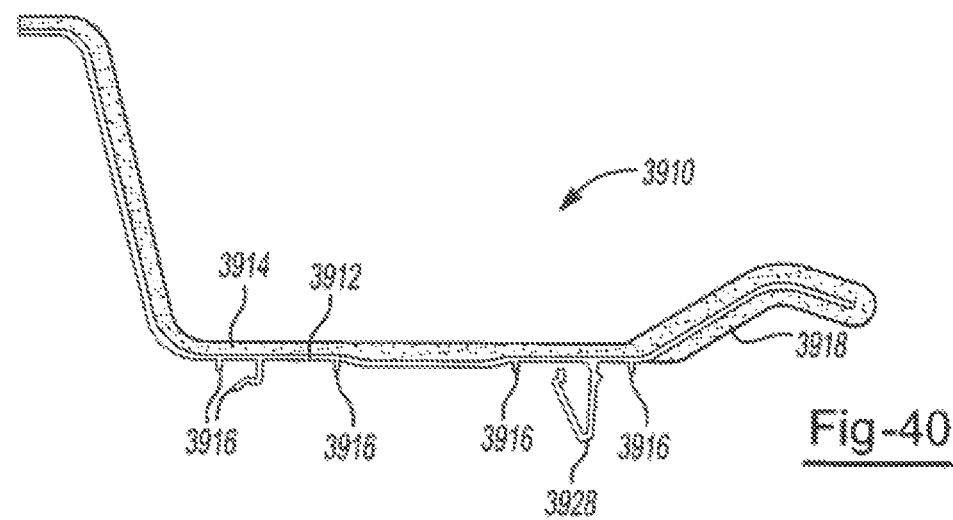
FIG. 40 is a section view of an exemplary member according to the teachings herein.

FIG. 40 illustrates a section view of an exemplary member 3910. The exemplary member 3910 includes a carrier 3912 and activatable material 3914 disposed thereon. The carrier 3912 may include one or more carrier extensions 3916. The carrier extensions 3916 may be of differing length. The carrier extensions 3916 may be substantially planar or may include a curved portion. The one or more carrier extensions 3916 may extend into the activatable material 3914. The activatable material 3914 may include one or more activatable material extensions 3918. The activatable material 3914 may have a varying thickness along the carrier 3912. The activatable material 3914 may be located along the entirety of one surface and along a portion of another surface of the carrier 3912. The carrier 3912 may include one or more fasteners 3928. The one or more fasteners 3928 may be integral with the carrier 3912.

Figure 41:
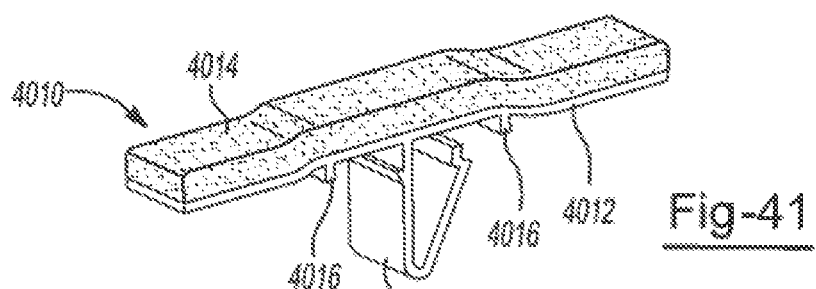
FIG. 41 is a perspective view of an exemplary member according to the teachings herein.

FIG. 41 illustrates a perspective view of an exemplary member 4010 with a substantially planar carrier 4012 and activatable material 4014 disposed thereon. The carrier 4012 may include one or more carrier extensions 4016. The activatable material 4014 may be located along the entirety of one surface the carrier 4012. The carrier 4012 may include one or more fasteners 4028. The one or more fasteners 4028 may be integral with the carrier 4012.

Figure 42A:
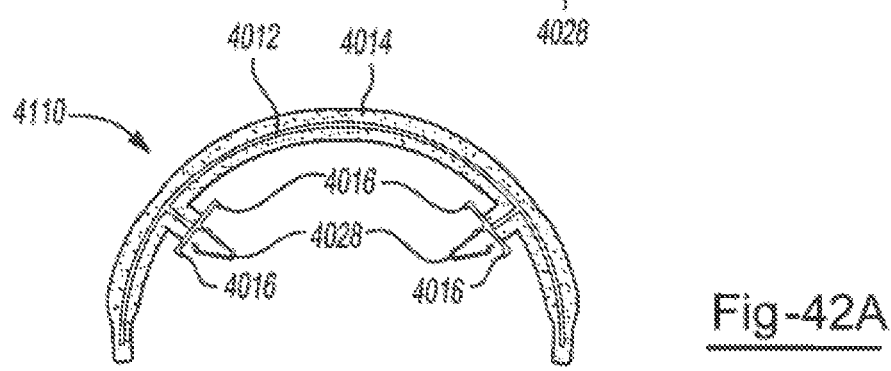
FIGS. 42A and 42B are section views of exemplary members according to the teachings herein.
Figure 42B:
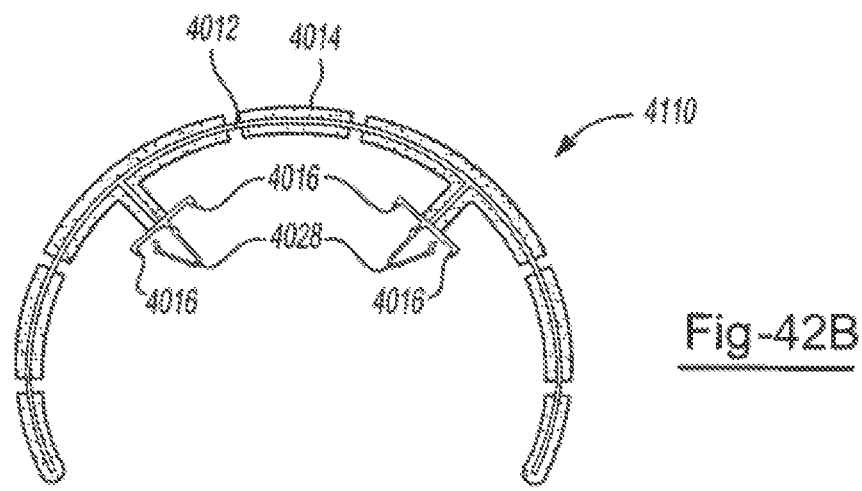

FIGS. 42A and 42B illustrate section views of exemplary members in a substantially half circle configuration. The exemplary member 4110 includes a carrier 4112 and activatable material 4114 disposed thereon. The carrier 4112 may include one or more carrier extensions 4116. The activatable material 4114 may be disposed along the entirety of the inner and outer surface of the carrier 4112 as shown in FIG. 42A. The activatable material 4114 may be disposed intermittently along the entirety of the inner and outer surface of the carrier of the 4114 as shown in FIG. 42B. The carrier 4112 may include two fasteners 4128. The two fasteners may extend from the carrier extensions 4116. The two fasteners 4128 may extend inward from the inner diameter of the carrier. The two fasteners 4128 may be integral with the carrier 4112.

Figure 43:
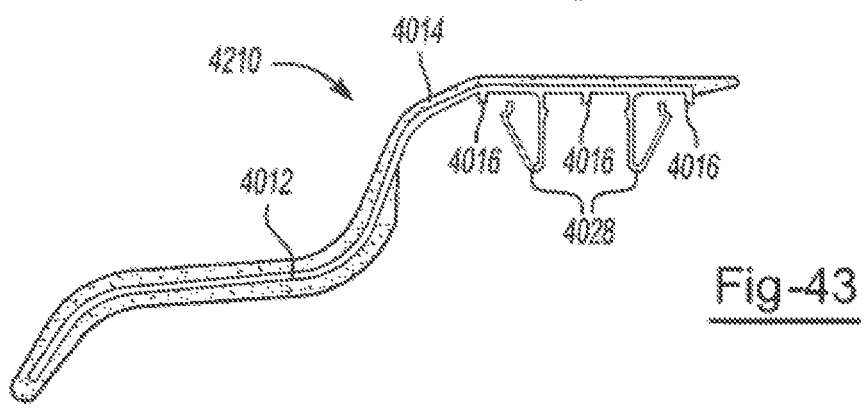
FIG. 43 is a section view of an exemplary member according to the teachings herein.

FIG. 43 illustrates a section view of an exemplary member 4210 in a serpentine configuration. The exemplary member 4210 includes a carrier 4212 and activatable material 4214 disposed thereon. The carrier 4212 may include one or more carrier extensions 4216. The activatable material 4214 may have a varying thickness along the carrier 4212. The activatable material 4214 may be located along the entirety of one surface and along a portion of another surface of the carrier 4212. The carrier 4212 may include two fasteners 4228. The two fasteners 4128 may both be located toward one side or end of the carrier. The two fasteners 4228 may be integral with the carrier 4212.

Figure 44:
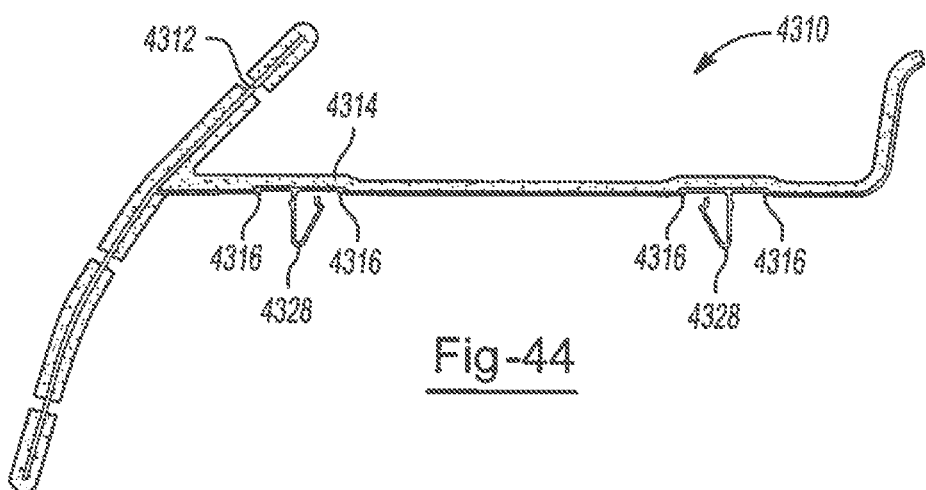
FIG. 44 is a section view of an exemplary member according to the teachings herein.

FIG. 44 illustrates a section view of an exemplary member 4310 with activatable material 4314 disposed both continuously and intermittently on the carrier 4312. The carrier 4312 may include one or more carrier extensions 4316. The carrier extensions 4316 may be substantially planar or may include a curved portion. The activatable material 4314 may be disposed continuously along portions of the carrier 4312 and the activatable material 4314 may be disposed intermittently along portions of the carrier 4312. The carrier 4312 may include two fasteners 4328. The two more fasteners 4328 may be integral with the carrier 4312.

Figure 45:
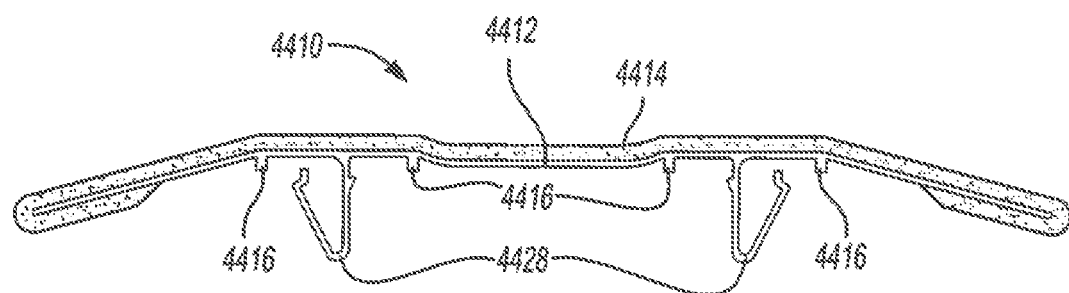
FIG. 45 is a section view of an exemplary member according to the teachings herein.

FIG. 45 illustrates a section view of an exemplary member. The exemplary member 4410 includes a carrier 4412 and activatable material 4414 disposed thereon. The carrier 4412 may include one or more carrier extensions 4416. The activatable material 4414 may be located along the entirety of one surface and along a portion of another surface of the carrier 4412. The carrier 4412 may include two fasteners 4428. The two more fasteners 4428 may be integral with the carrier 4412.

Figure 46:
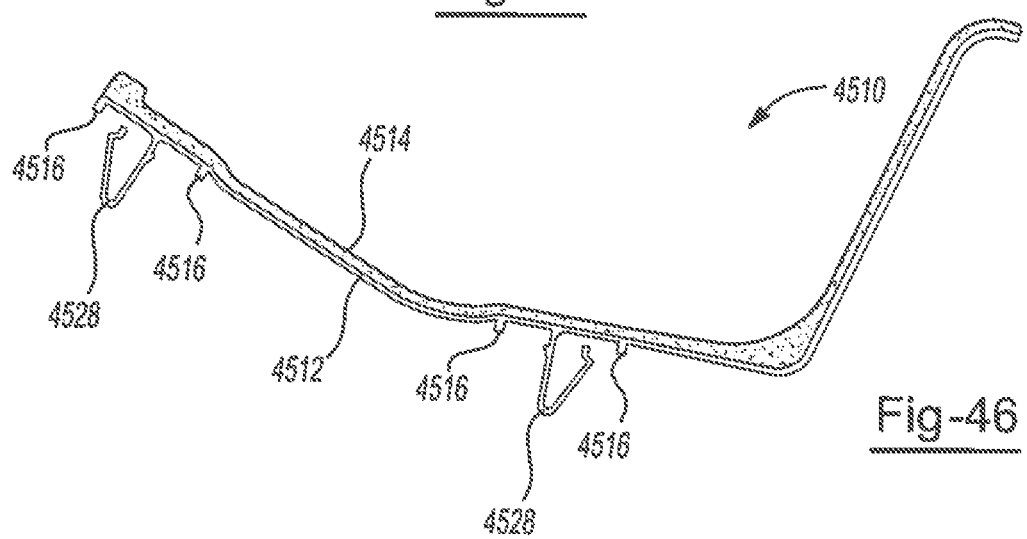
FIG. 46 is a section view of an exemplary member according to the teachings herein.

FIG. 46 illustrates a section view of an exemplary member 4510 in a substantially L-shaped configuration with activatable material 4514 of varying thickness. The carrier 4512 may include one or more carrier extensions 4516. The carrier 4512 may include two fasteners 4528. A fastener 4528 may be located at a central location along the carrier 4512. A fastener 4528 may be located toward one side or end of the carrier. The two fasteners 4528 may be integral with the carrier 4512.

FIG. 47 illustrates a perspective view of an exemplary member. The member 4610 includes a carrier 4612 with an activatable material 4614 located thereon. The activatable material 4614 may substantially enclose the carrier 4612. The activatable material 4614 may have a varying thickness along an end of the carrier 4212. The carrier 4612 may include one or more carrier extensions 4616. The carrier 4612 may include one or more fasteners 4628. The fastener 4628 may be a substantially V-shaped fastener.

FIG. 48 illustrates a perspective view of an exemplary member in a substantially L-shaped configuration. The member 4710 includes a carrier 4712 with an activatable material 4714 located thereon. The carrier 4712 may include one or more curved portions. The activatable material 4714 may have a varying thickness along the carrier 4712. The carrier 4712 may include one or more carrier extensions 4716. The carrier extensions 4716 may extend at both skew and perpendicular angles. The carrier 4712 may include two fasteners 4728. The two fasteners 4728 may be integral with the carrier 4712.

FIG. 49 illustrates a section view of an exemplary member in a substantially V-shaped configuration. The member 4810 includes a carrier 4812 with an activatable material 4814 located thereon. The activatable material 4814 may have a varying thickness along the carrier 4812. The carrier 4812 may include one or more carrier extensions 4816. The carrier extensions 4816 may extend at both skew and perpendicular angles. The carrier 4812 may include two fasteners 4828. The two fasteners 4828 may both be located on one side of the carrier 4812. The two fasteners 4828 may be integral with the carrier 4812.

FIG. 50 illustrates a perspective view of an exemplary member 4910 with a substantially L-shaped carrier 4912 and activatable material 4914 disposed thereon. T The activatable material 4914 may extend beyond the ends of the carrier 4912. The carrier 4912 may include one or more carrier extensions 4916. The carrier extensions 4916 may be substantially planar or may include a curved portion. The activatable material 4914 may be located along the entirety of one surface the carrier 4912. The carrier 4912 may include one or more fasteners 4928. The one or more fasteners 4928 may be integral with the carrier 4912.

Though not necessarily drawn to all geometries relative proportions and dimensions shown in the drawings are also part of the teachings herein, even if not explicitly recited. However, unless otherwise noted, nothing shall limit the teachings herein to the geometries, relative proportions, and dimensions shown in the drawing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention claimed is:

1. An article comprising:
   a. a carrier split along a portion of a length to create a plurality of end extensions each having a hinge portion, a pair of the plurality of end extensions forming a U-clip at a first end of the carrier, wherein an interior surface of each of the pair of end extensions forms a channel therebetween;
   b. an activatable material disposed on the carrier, wherein the activatable material includes at least one hinge portion that aligns with at least one of the hinge portions of the plurality of end extensions so that the activatable material is flexible about the at least one hinge portion of the activatable material, the at least one hinge portion of the activatable material being formed of a localized change in thickness of the activatable material; and
   c. a plurality of carrier extensions extending from the carrier, each carrier extension having the activatable material extend co-extensively with the carrier extension;
   wherein the channel is free of activatable material and the activatable material is disposed on an exterior surface of the pair of end extensions that opposes the interior surface; and
   wherein a second end of the carrier opposing the first end is free of the plurality of end extensions and the channel therebetween, and the activatable material covers the second end.

2. The article of claim 1, wherein one or more activatable material extensions extend from the activatable material.

3. The article of claim 2, wherein the carrier includes one or more fasteners.

4. The article of claim 3, wherein at least one fastener is located in a differing plane from at least one other fastener.

5. The article of claim 3, wherein the activatable material is at least partially disposed on at least one fastener.

6. The article of claim 2, wherein the activatable material has a curved profile.

7. The article of claim 1, wherein the plurality of carrier extensions extend into the activatable material.

8. The article of claim 1, wherein the carrier is flexible about the hinge portions of the plurality of end extensions.

9. The article of claim 1, wherein the carrier is comprised of a pliable material.

10. The article of claim 1, wherein portions of the carrier are located in different planes from one another.

11. The article of claim 1, wherein the carrier forms a circle or a portion of a circle.

12. The article of claim 1, wherein the plurality of carrier extensions extend outward radially from the carrier.

13. The article of claim 1, wherein the carrier splits into two distinct connected portions that both extend from the carrier.

14. The article of claim 1, wherein the channel only extends partially along the length of the carrier.

15. The article of claim 1 any of the preceding claims, wherein the activatable material extends beyond an end of the carrier.

16. The article of claim 1, wherein the activatable material is disposed on the carrier between the plurality of carrier extensions.

17. The article of claim 1, wherein the channel is wider at an opening of the channel located near a terminal end of the pair of end extensions and the channel narrows as it continues along the length of the carrier towards a center of the carrier.

18. The article of claim 1, wherein the activatable material covers a terminal end of each of the pair of end extensions, and the interior surface of each of the pair of end extensions is free of the activatable material.

\* \* \* \* \*